US009534673B2

(12) United States Patent
Chevalier et al.

(10) Patent No.: US 9,534,673 B2
(45) Date of Patent: Jan. 3, 2017

(54) CONTINUOUSLY VARIABLE TRANSMISSION DEVICE

(71) Applicant: INAWA, Lechatelet (FR)

(72) Inventors: Pierre Chevalier, Lechatelet (FR); Adrien Panzuti, Seurre (FR)

(73) Assignee: INAWA, Lechatelet (FR)

( * ) Notice: Subject to any disclaimer, the term of this patent is extended or adjusted under 35 U.S.C. 154(b) by 21 days.

(21) Appl. No.: 14/408,412

(22) PCT Filed: Jun. 20, 2013

(86) PCT No.: PCT/EP2013/062939
§ 371 (c)(1),
(2) Date: Dec. 16, 2014

(87) PCT Pub. No.: WO2013/190067
PCT Pub. Date: Dec. 27, 2013

(65) Prior Publication Data
US 2015/0240921 A1    Aug. 27, 2015

(30) Foreign Application Priority Data

Jun. 21, 2012 (FR) ...................... 12 55867

(51) Int. Cl.
*F16H 15/50* (2006.01)
*F16H 15/42* (2006.01)
(Continued)

(52) U.S. Cl.
CPC ............... *F16H 15/50* (2013.01); *B62M 9/06* (2013.01); *F16H 15/30* (2013.01); *F16H 15/38* (2013.01); *F16H 15/42* (2013.01); *F16H 15/52* (2013.01)

(58) Field of Classification Search
None
See application file for complete search history.

(56) References Cited

U.S. PATENT DOCUMENTS 3,760,646 A * 9/1973 Kraus ............... F16H 15/36
476/10
RE41,892 E * 10/2010 Miller ............... B62K 3/002
476/36

FOREIGN PATENT DOCUMENTS

DE         3825860 A1    2/1989
DE  10 2006 016 955 A1  10/2007
(Continued)

OTHER PUBLICATIONS

PCT/EP2013/062939, International Search Report, European Patent Office, Aug. 30, 2013.
(Continued)

*Primary Examiner* — Colby M Hansen
(74) *Attorney, Agent, or Firm* — Soquel Group LLC

(57) ABSTRACT

A continuously variable transmission device including a guiding cover rotating about a first axis, a guided cover rotating about a second axis, a planet gear including a first belt in contact with an inner surface of the guiding cover and a second belt in contact with an inner surface of the guided cover, contact areas between the belts and the inner surfaces of the covers being defined in a single first radial plane relative to the first axis, wherein the planet gear rotates about a third axis contained in the first radial plane, the angular orientation relative to the first axis defining the transmission ratio of the device, and wherein the planet gear pivots about a fourth axis perpendicular to the first radial plane and nonintersecting with the first axis, and pivots about a fifth axis parallel to the first radial plane and perpendicular to the third axis.

11 Claims, 21 Drawing Sheets

(51) Int. Cl.
  *F16H 15/52*  (2006.01)
  *F16H 15/38*  (2006.01)
  *F16H 15/30*  (2006.01)
  *B62M 9/06*  (2006.01)

(56) References Cited

FOREIGN PATENT DOCUMENTS

| DE | 102006039319 A1 | * | 2/2008 |
|---|---|---|---|
| FR | 2 173 528 A5 | | 10/1973 |

OTHER PUBLICATIONS

PCT/EP2013/062939, Rapport de Recherche Internationale, Office Européen des Brevets, Aug. 30, 2013.
FR 12 55867, Rapport de Recherche Préliminaire, Institut National de la Propriété Industrielle (INPI), Oct. 18, 2012.

\* cited by examiner

CONTINUOUSLY VARIABLE TRANSMISSION DEVICE

CROSS REFERENCE TO RELATED APPLICATIONS

This application claims benefit under 35 USC §371 of PCT Application No. PCT/EP2013/062939 entitled CONTINUOUSLY VARIABLE TRANSMISSION DEVICE and filed on Jun. 20, 2013 by inventors Pierre Chevalier and Adrien Panzuti. PCT Application No. PCT/EP2013/062939 claims priority of French Patent Application No. 12 55867 entitled DISPOSITIF DE TRANSMISSION CONTINÛMENT VARIABLE and filed on Jun. 21, 2012 by inventors Pierre Chevalier and Adrien Panzuti.

FIELD OF THE INVENTION

The invention relates to a continuously variable transmission device for transmitting a rotational movement.

Such a device may for example be used in the motor or pump industry as well as in the automobile field or, more generally, the mobility field.

In these different fields, continuously variable transmission devices (CVD), sometimes called "variable speed transmissions", have the particular advantage of being able to control the speed of rotation of the output shaft continuously, which has an advantage over transmissions with fixed reduction ratios.

BACKGROUND OF THE INVENTION

It is known to use the ratio of two diameters between an input and an output to produce a CVT-type transmission. The motion transmission between the input and the output occurs by friction.

Thus, DE-A-10 2006 016 955 and FR-A-2,173,528 disclose variable speed drives in which two bells cooperate with a planet gear that bears against the inner surfaces of those bells and whose angular position around an axis perpendicular to and not intersecting the axis of rotation of the bells makes it possible to adjust the transmission ratio of that variable speed transmission. The position of the planet gear relative to the inner surfaces of the bells is adjusted by sliding the planet gear relative to those surfaces, perpendicular to its direction of rotation. During that sliding, the means for controlling the position of the planet gear must overcome a frictional force between the planet gear and the inner surfaces of the bells. To avoid excessive stress on those control means, that frictional force should therefore be relatively low. Furthermore, for effective transmission of the movement within the variable speed transmission, it is important to limit the slipping between the input and output elements, i.e., to work with a relatively high friction coefficient between the planet gear and those surfaces.

There are therefore two opposite constraints relative to the friction coefficient between the planet gear and the inner surfaces of the bells, which requires compromises and is detrimental either to the lifetime of the variable speed transmission or to its efficiency. Furthermore, in these known variable speed transmissions, adjusting the angular position of the planet gear is relatively time-consuming, since it is necessary to account for the slipping to be done between the planet gear and the inner surface of the bells, that slipping not being able to be immediate in light of the friction between those parts. Furthermore, this slipping of the planet gear, perpendicular to its direction of rotation when its position is being adjusted, tends to wear the planet gear and/or the inner surface of the bells out.

SUMMARY OF THE DESCRIPTION

The invention more particularly aims to resolve these drawbacks and this dual constraint by proposing a new continuously variable transmission device whose transmission ratio can be adjusted quickly, with less force and less wear than in the known materials, while limiting the number of parts of the device.

To that end, the invention relates to a continuously variable transmission device for transmitting a rotational movement comprising a driving bell rotating around a first axis, a driven bell rotating around a second axis aligned with the first axis, and a planet gear provided with a first belt in contact with an inner surface of the driving bell and a second belt in contact with the inner surface of the driven bell, contact zones between said belts and the inner surfaces of the bells being defined in a same first radial plane relative to the first axis, while the planet gear rotates around a third axis included in the first radial plane and the angular orientation of which relative to the first axis defines the transmission ratio of the device and while the planet gear pivots around a fourth axis perpendicular to the first radial plane and not intersecting the first axis. According to the invention, the planet gear pivots around a fifth axis parallel to the first radial plane and perpendicular to the third axis.

Owing to the invention, the input and output speed ratio of the device can be changed by changing the angular position of the planet gear resulting not from direct slipping of the planet gear on the inner surfaces of the driving and driven bells, but rather by pivoting around the fifth axis. Thus, the control force necessary to change the speed ratio of the device according to the invention is lower than that necessary in the variable speed transmissions known from DE-A-10 2006 016 955 and FR-2,173,528. As a result, the wear of the device is lower and speed ratio changes are faster than with these known variable speed transmissions.

According to advantageous, but optional aspects of the invention, such a device may incorporate one or more of the following features, considered in any technically allowable combination:

The angular position of the planet gear around the fourth axis is adjustable by primary tilting of the planet gear around the fifth axis, said primary tilting causing secondary tilting of the planet gear around the fourth axis.

The secondary tilting of the planet gear is brought about by its primary tilting creating resultant forces, producing a pivoting torque, and by the fact that the inner surfaces of the bells are warped and the bells rotate.

Means for controlling the angular position of the planet gear around the fifth axis act on the planet gear by making it pivot around a fifth axis, by orienting the belts of the planet gear relative to the inner surfaces of the bells by primary tilting, causing secondary tilting of the planet gear around the fourth axis. Alternatively, the planet gear rotates freely around the fourth axis and the fifth axis, while a differential torque created between the driving bell and the driven bell act on the planet gear by causing it to pivot around the fifth axis, by orienting the belts of the planet gear relative to the inner surfaces of the bells by primary tilting that causes secondary tilting of the planet gear around the fourth axis.

The two bells are rotatably mounted on a same fixed shaft, a longitudinal axis of which is parallel to the first axis, while the planet gear is mounted pivoting on the shaft, around the fourth axis.

The driving bell is secured to a driving shaft, while the driven bell is secured to a driven shaft, and the device comprises a housing for maintaining and guiding the rotation of the driving bell, the driven bell and the planet gear. The device then advantageously comprises a planet gear carrier that defines the position of the third axis and is mounted pivotably around the fourth axis and around the fifth axis, relative to the housing. This planet gear carrier can be mounted in the housing by a Cardan joint with control finger. In that case, it is possible to provide that a control finger of the Cardan joint is translated in a plane perpendicular to the fifth axis and including the third axis. Alternatively, the planet gear carrier is mounted in the housing by a double pivot link comprising a first pivot link around the fourth axis, that first pivot link being freely rotated, and a second pivot link around the fifth axis, that second pivot link being steered in rotation.

BRIEF DESCRIPTION OF THE DRAWINGS

The invention will be better understood and other advantages thereof will appear more clearly in light of the following description of four embodiments of a device according to its principle, provided solely as an example and done in reference to the appended drawings, in which.

DETAILED DESCRIPTION

Figure 1:
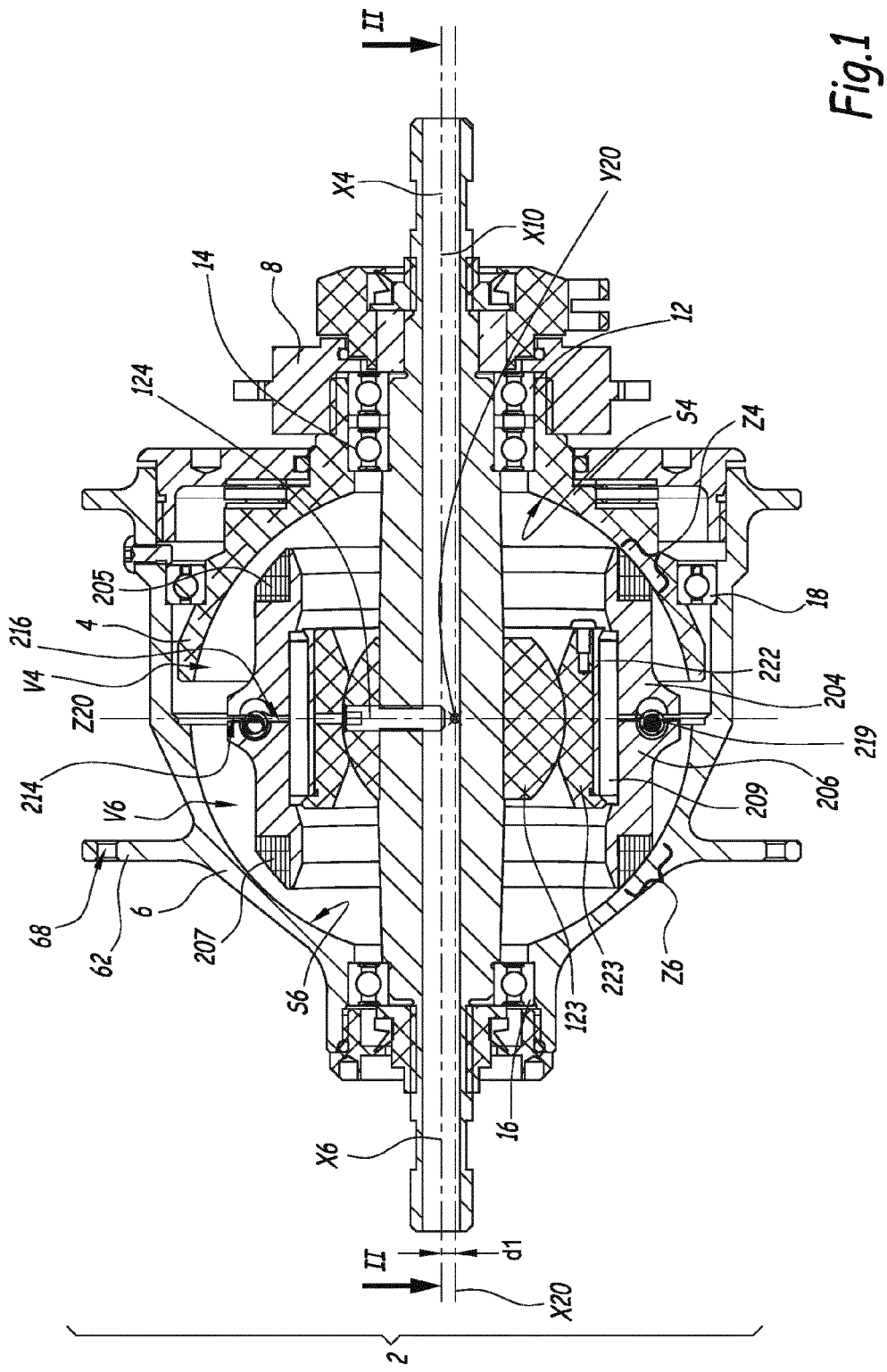
FIG. 1 is an axial cross-section of a transmission device according to the invention in a first usage configuration.

The continuously variable transmission device 2 shown in FIGS. 1 to 8 is designed to transmit a rotational movement between a driving bell 4 and a driven bell 6. In the example, the driving bell is secured in rotation with a pinion 8 designed to mesh with a chain (not shown), while the driven bell 6 is provided with two outer flanges 62 and 64 provided with orifices 66 for attaching spokes of a cycle wheel. Thus, the device 2 can be used to drive the back wheel of a cycle, using a chain engaged with the pinion 8.

Reference X4 denotes the axis of rotation of the bell 4 and X6 denotes the axis of rotation of the bell 6. The axes X4 and X6 are parallel and aligned.

The bells 4 and 6 are rotatably mounted around a fixed shaft 10, a longitudinal and central axis X10 of which is parallel to the axes X4 and X6. The axis X10 is an axis of symmetry for the shaft 10. In practice, the axes X4, X6 and X10 are combined. Bearings 12, 14 and 16 make it possible to support the bells 4 and 6 on the shaft 10 with a possibility of rotation. A bearing 18 is mounted between the outer surface of the bell 4 and the inner surface of the bell 6, allowing a differentiated rotational movement of those bells around the axes X4 and X6, respectively.

References S4 and S6 respectively denote the inner surfaces of the bells 4 and 6, those surfaces respectively being centered on the axes X4 and X6.

The device 2 also comprises a planet gear 20 mounted on the shaft 10 with the possibility of rotating around an axis X20. When the axes X20 and X10 are parallel, the axis X20 is offset relative to the axis X10 in a radial direction relative to the axis X10, by a non-zero distance d1.

The planet gear 20 comprises two rings 204 and 206 respectively positioned in the inner volume V4 or V6 of a bell 4 or 6 and each provided with a belt 205 or 207 designed to be in contact with the inner surface S4 or S6 of the adjacent bell.

Thus, in the plane of FIG. 1, which is radial relative to the axes X4, X6 and X10, a first contact zone Z4 is defined between the belt 205 and the surface S4, while a second contact zone Z6 is defined in that same plane between the belt 207 and the surface S6.

The speed transmission ratio of the device 2 depends on the ratio of the distance between the zone Z4 and the axis X10 on the one hand, and the distance between the zone Z6 and the axis X10 on the other hand. The higher the ratio is, i.e., the further the zone Z4 is from the axis X10, the higher the speed transmission ratio is.

Figure 4:
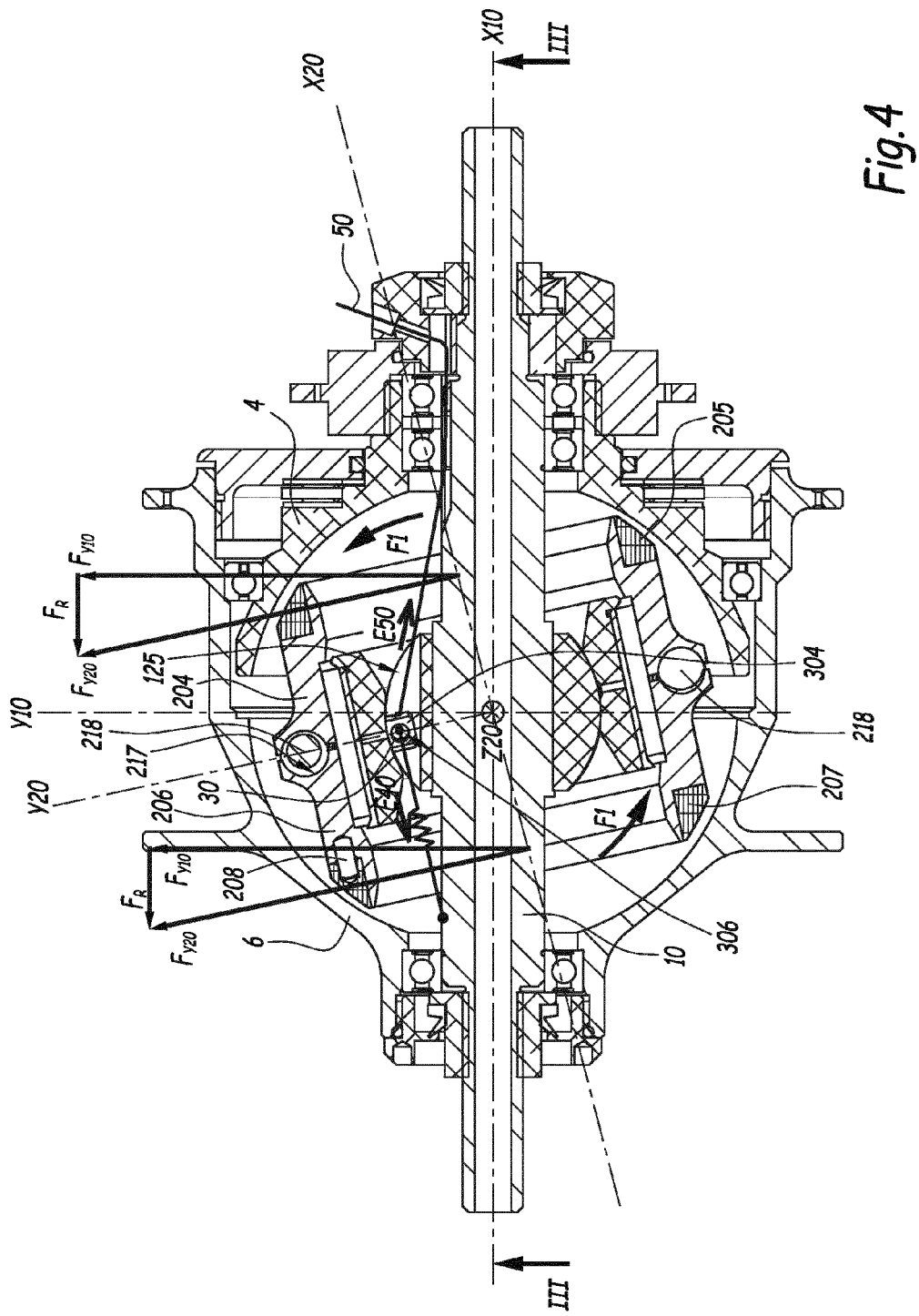
Figure 7:
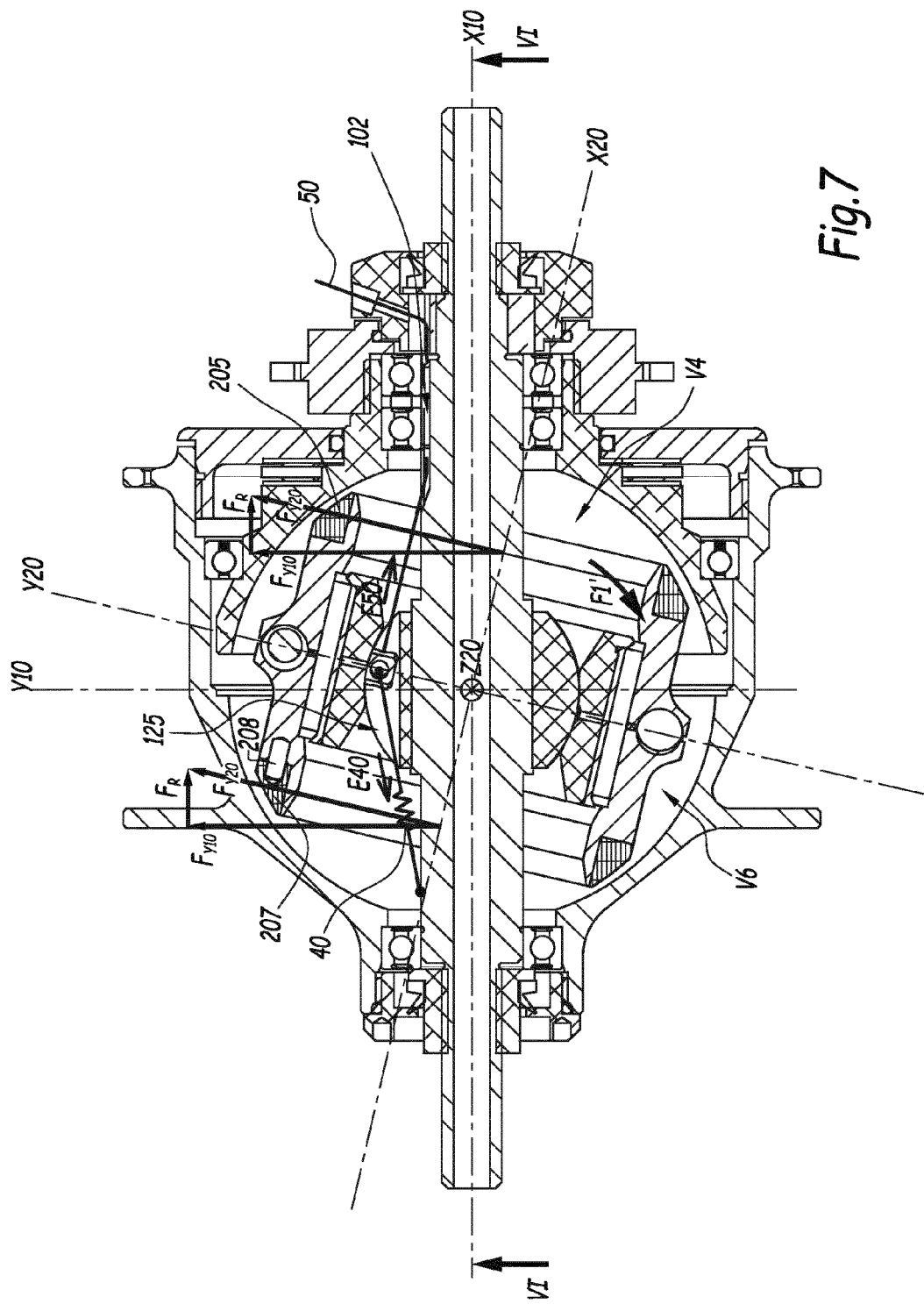

As shown by FIGS. 4 and 7, the belt 207 is immobilized on the ring 206 using slugs 208. Similar slugs, not shown in the figures, are used to secure the elements 204 and 205 in rotation. Alternatively, the elements 207 and 206, and the elements 204 and 205, respectively, can be in a single piece.

A bearing 209 is engaged in the inner volume of the rings 204 and 206.

References 214 and 216 respectively denote the surfaces of the rings 204 and 206 that are radial relative to the axis X20 and oriented toward the other ring. The surface 216 is provided with hollow housings 217 in which balls 218 and springs 219 are partially accommodated. The surface 214 is also provided with hollow housings 220 for partially receiving balls 218. Thus, in the mounted configuration of the device 2, the balls are positioned between the surfaces 214 and 216 and partially engaged in the housings 217 and 220. Springs 219 are positioned near the balls 218 and accommodated in housings adjacent to the housings 217.

Based on the resisting torque of the driven bell 6 relative to the driving bell 4, the relative angular position of the rings 204 and 206 around the axis X20 can vary, in a direction such that the balls 218 move in the housings 217 toward the springs 219. In light of the geometry of the housings 217, the depth of which relative to the surface 216 decreases coming closer to the adjacent housings that receive the springs 219, this relative angular movement of the rings 204 and 206 results in axially expanding the planet gear 20, i.e., axially separating the rings 204 and 206 from each other and increasing the intensity of the contact force between the belt 205 and the surface S4 and between the belt 207 and the surface S6. At the end of travel of the balls 218 in the housings 217, the springs 219 exert a return force in a direction opposite the relative angular movement between the rings 204 and 206. Thus, the elements 217 to 220 constitute a pre-stress mechanism that makes it possible to adjust the contact force between the belts 205 and 207 and the inner surfaces of the bells, based on the resisting torque of the driven bell 6 relative to the driving bell 4.

Alternatively, the balls 218 can be replaced by other rolling elements, such as rollers or needles. In that case, the geometry of the housings 217 and the position of the springs 218 are adapted accordingly.

The planet gear 20 also comprises a sleeve 222 positioned radially inside the bearing 209 and a first part of a ball joint 223 immobilized inside the sleeve 222.

Furthermore, a second ball joint part 123 is immobilized on the shaft 10 using a screw 124.

A needle cage makes up the bearing 209 with rolling bodies and allows the rotation of the planet gear 20 around the axis X20, while the shaft 10 and the ball joint are fixed in rotation relative to the axis X10.

The offset between the axes X10 and X20 comes from the geometry of the inner part 123 of the ball joint which, in the plane of FIG. 1, is not symmetrical relative to the axis X10.

In practice, the outer part 223 of the ball joint is made up of two half-shells that are attached around the part 123 once the latter is immobilized on the shaft 10 by the screw 124. The two half-shells are then kept in place by the sleeve 222, which acts as a binding band.

The part 123 is provided with a notch 125 in which a slug 30 emerges, the tail of which 302 is immobilized in the part 223 of the ball joint, for example screwed into that part. The head 304 of the slug 30, which is provided with a piercing 306, is engaged in the notch 125, which guides it in translation in a motion parallel to the plane of FIGS. 2, 4 and 7.

A spring 40 is attached in the piercing 306 by a first end 402, and on the shaft 10 by a second end 404. This spring forms an elastically deformable element for returning the slug 30 to its position.

A cable 50 is attached, by a first end 502, in the piercing 306 and extends as far as the outside of the device 2. In practice, the cable 50 passes through a groove 102 arranged in the outer surface of the shaft 10, in a direction parallel to the axis X10. In FIG. 7, the depiction of the cable 50 is interrupted to make it possible to view the groove 102. Said groove is positioned radially inside bearings 12 and 14, which allows the cable 10 to emerge outside the inner volume of the device 2, i.e., the sum of the volumes V4 and V6. Outside that volume, the cable 50 passes through a stopper 60 via an orifice 602 that emerges radially outward.

Figure 2:
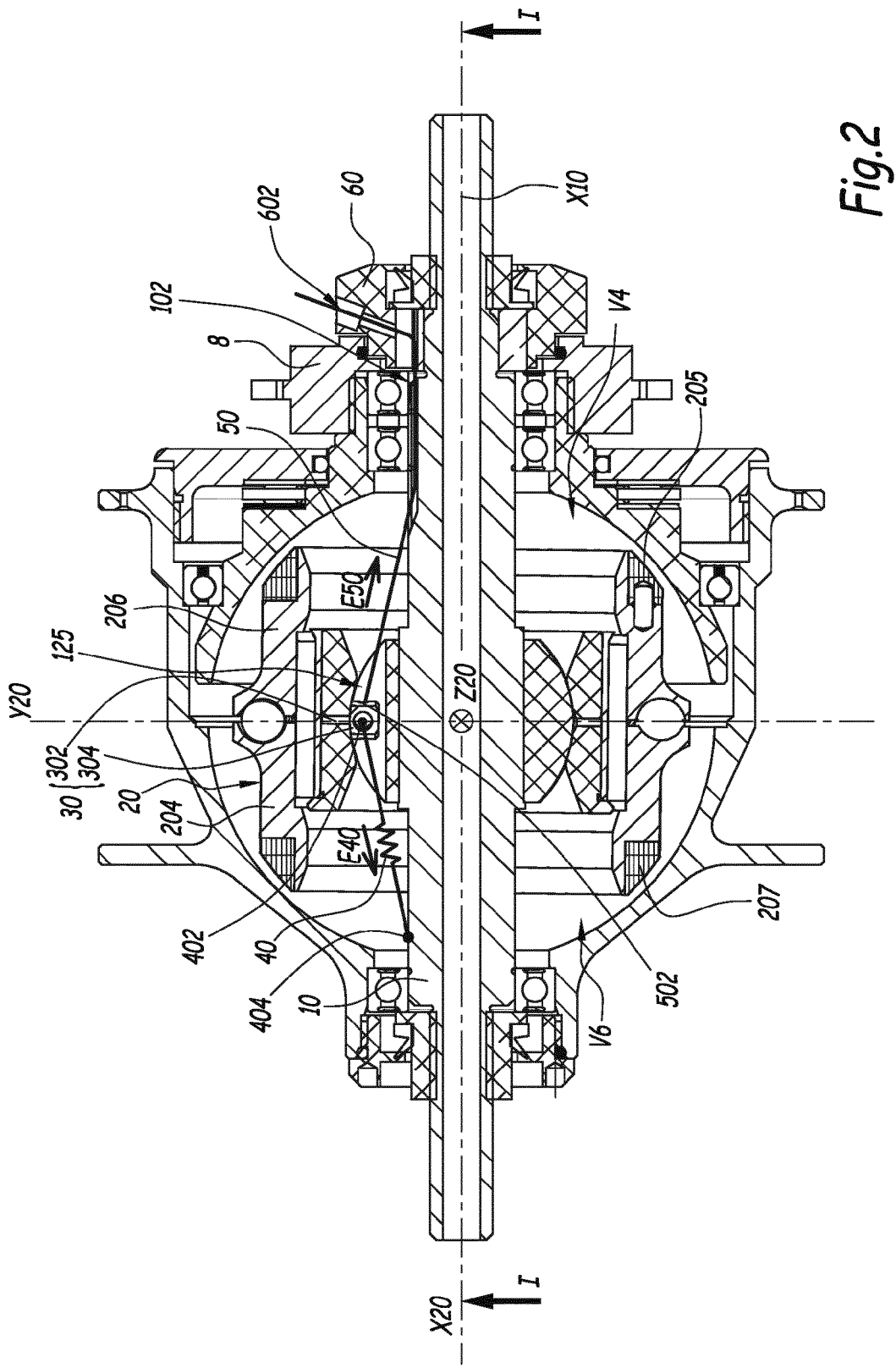
FIG. 2 is a cross-section along line II-II in FIG. 1; in this figure, I-I designates the cutting plane of FIG. 1.

Thus, the slug 30 is subjected to antagonistic forces, i.e., an elastic attraction force E40 exerted by the spring 40, which tends to move it to the left in FIG. 2, and a traction force E50 transmitted by the cable 50 when it is pulled. The forces E40 and E50 are exerted in the two main directions of the spring and the cable, near their ends 402 and 502. For clarity of the drawing, the arrows showing these forces are laterally offset in FIGS. 2, 4 and 7.

The planet gear 20 pivots freely around an axis Y20 perpendicular to the plane of FIG. 1, i.e., a radial plane relative to the axis X4 that contains the contact zones Z4 and Z6. The planet gear can thus the planet gear can assume the positions shown in FIGS. 1, 5 and 8, respectively, relative to the bells 4 and 6.

In the configuration of FIGS. 1 and 2, the zones Z4 and Z6 extend at a same radial distance from the axes X4 and X6. Thus, the transmission ratio of the rotational movement between the bells 4 and 6 is equal to 1.

Figure 5:
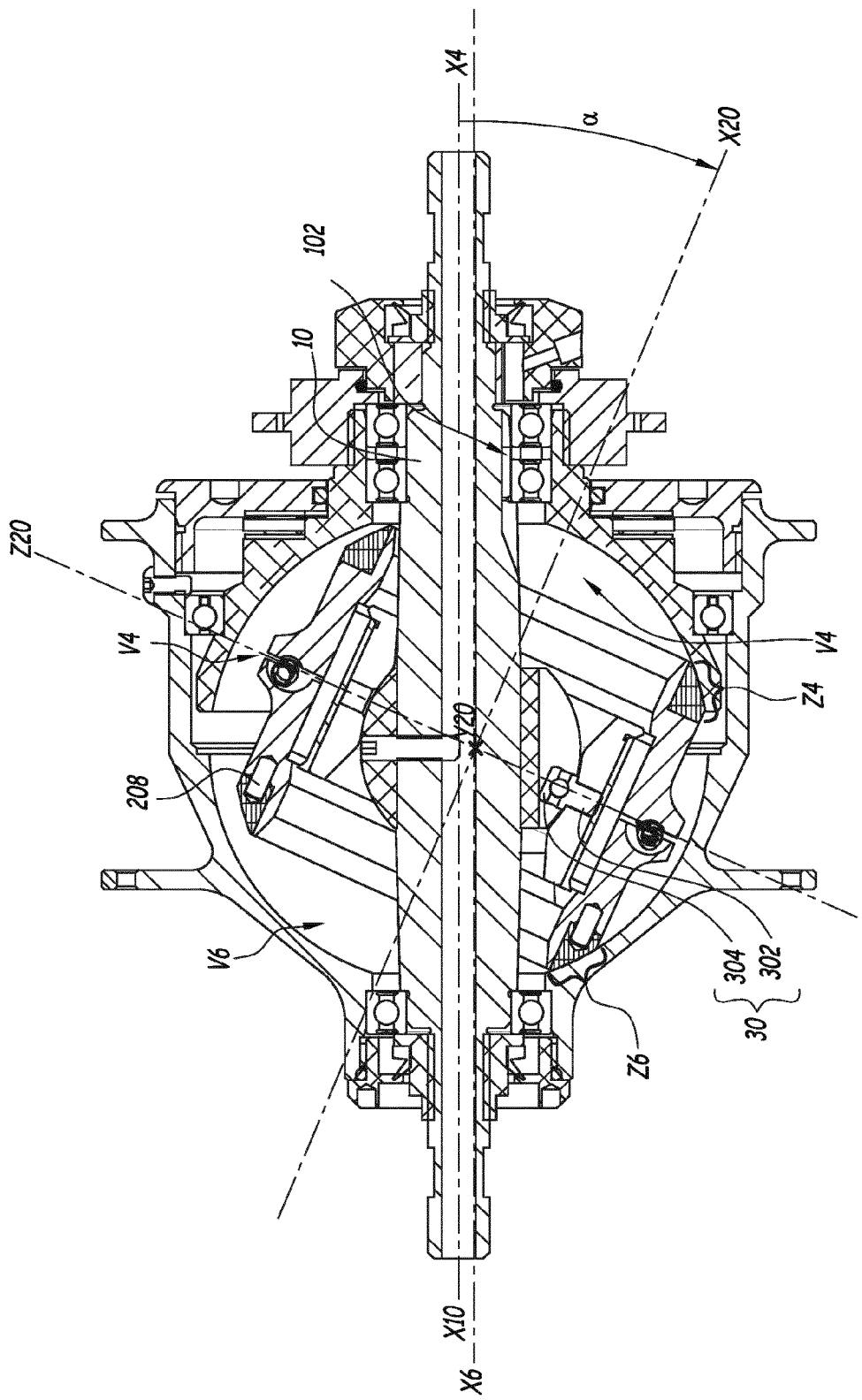
FIG. 5 is a cross-section similar to FIG. 3 when the planet gear has reached an offset position relative to that of FIG. 3.

In the configuration of FIG. 5, the zone Z4 is radially further from the axis X4 than the zone Z6 is from the axis X6.

In this configuration, the reduction ratio of the device 2 is maximal. Thus, the bell 6 rotates faster than the bell 4. The speed transmission ratio of the rotational movement between the bells 4 and 6 is greater than 1.

Intermediate configurations between those of FIGS. 1 and 2 on the one hand, and 5 on the other hand, may be achieved as explained below.

In the configuration of FIG. 5, the axis X20 forms a non-zero angle α with the axis X10 in the plane of that figure.

Figure 8:
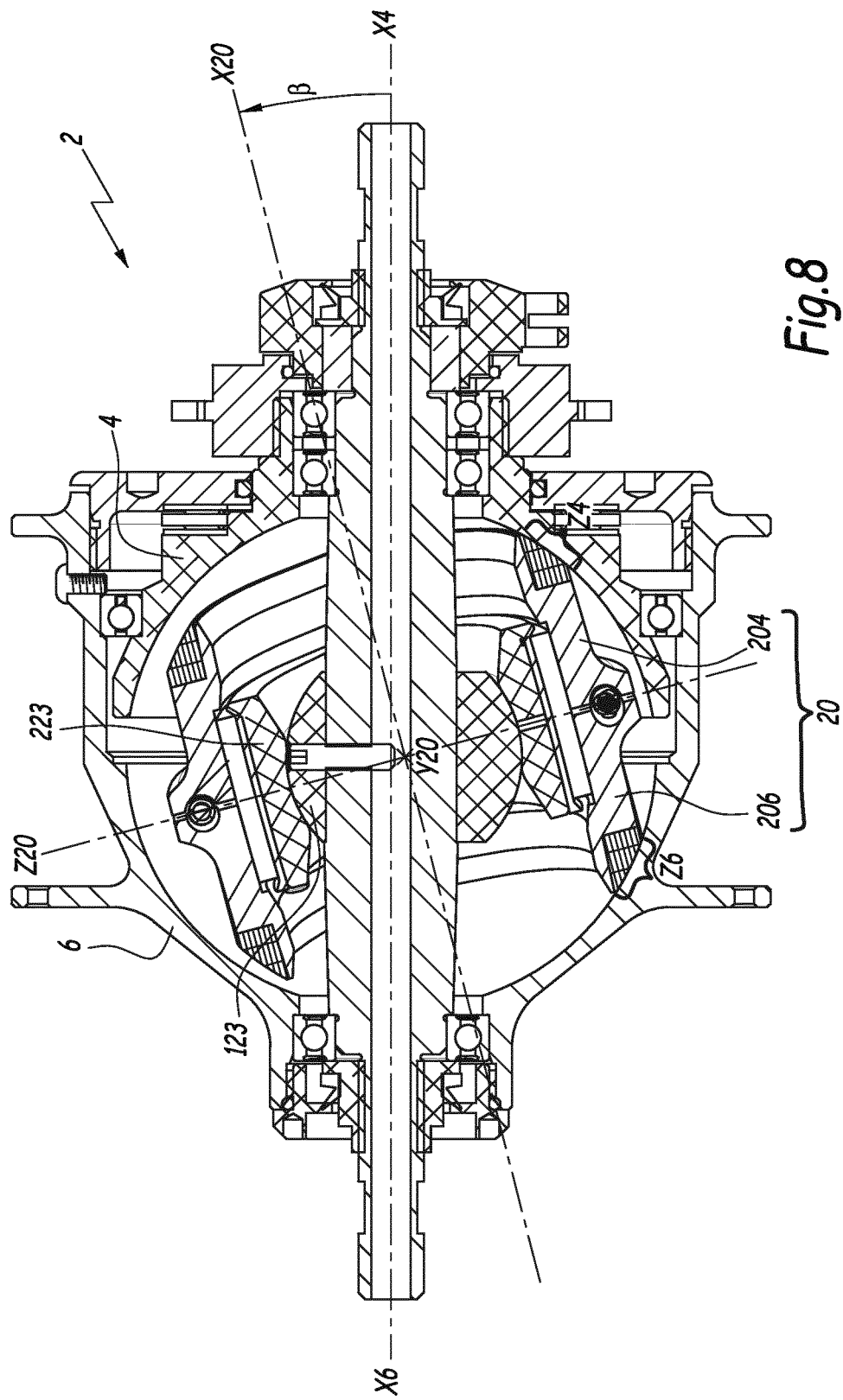
FIG. 8 is a cross-section similar to FIG. 6 when the planet gear has reached an offset position relative to that of FIG. 6.

In the configuration of FIG. 8, the planet gear 20 is tilted in the direction opposite the configuration of FIG. 5. The axis X20 forms an angle β with the axis X10 oriented in the opposite direction relative to the angle α and having practically the same value. In that case, the zone Z4 is radially closer to the axis X4 than the zone Z6 is to the axis X6, such that the transmission ratio of the device 2 is less than 1, in practice minimal in the configuration shown in FIG. 8. The bell 6 rotates more slowly than the bell 4.

Intermediate configurations between those of FIGS. 1 and 2 on the one hand, and 8 on the other hand, can be reached as explained below.

The planet gear 20 is also rotatable, i.e., pivotable, around a fifth axis Z20 that extends perpendicular to the axis X20 in the plane of FIGS. 1, 3, 5, 6 and 8.

The position of the planet gear 20 relative to the driving and driven bells 4 and 6 is controlled not in the plane of FIGS. 1, 3, 5, 6 and 8 that contains the contact zones Z4 and Z6 between that planet gear and said bells, but in a perpendicular plane shown in FIGS. 2, 4 and 7.

In the configuration of FIGS. 1 and 2, the traction force E50 exerted via the cable 50 balances the elastic traction force E40 exerted by the spring 40 stretched between the head 304 and the fixed shaft 10. Under these conditions, the planet gear 20 does not tend to change positions relative to the bells 4 and 6. In other words, the position of the zones Z4 and Z6 relative to the axes X4 and X6 is stable.

Figure 3:
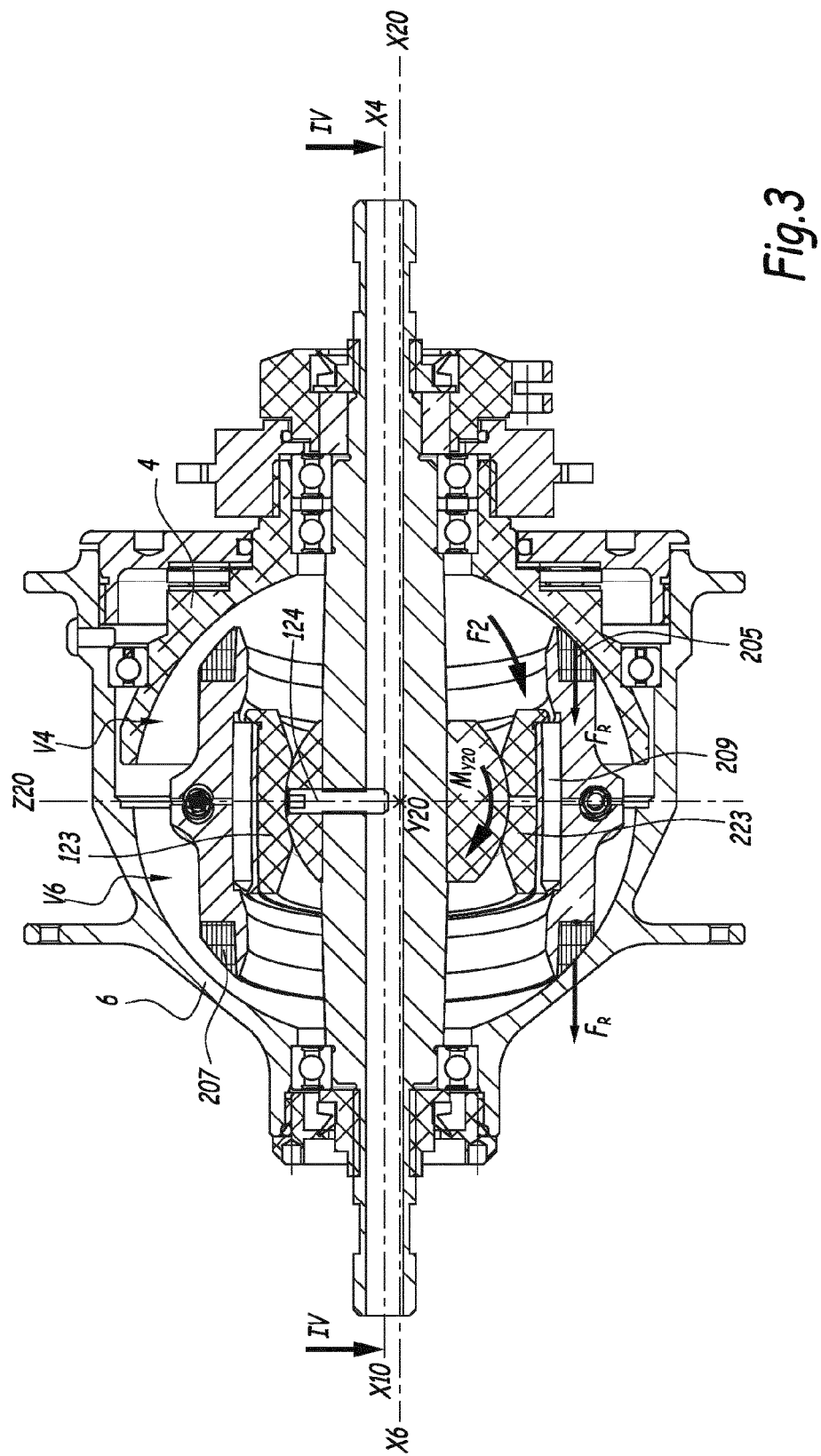
FIGS. 3 and 4 are cross-sections respectively similar to FIGS. 1 and 2 in a second usage configuration of the device; in these figures, and IV-IV indicates the corresponding cutting planes.

In the configuration of FIGS. 3 and 4, the elastic force E40 overcomes the traction force E50, which creates primary pivoting or tilting of the planet gear 20 in the trigonometric direction, as shown by arrow F1, in the plane of FIG. 4 around the axis Z20.

In the plane of FIG. 4, the axis of the planet gear X20 not being parallel to the axis X10, traction forces $F_{Y10}$ of the bells and traction forces $F_{Y20}$ of the planet gear do not have the same direction and thus create resultant forces $F_R$ at the origin of a pivoting torque $M_{Y20}$ visible in FIG. 3. This primary tilting F1 of the planet gear 20 around the axis Z20, combined with the fact that the inner surfaces S4 and S6 of the bells are warped and the bells are rotating, generates secondary tilting around the axis Y20 in the direction of arrow F2 in FIG. 3, i.e., in a direction increasing the transmission ratio of the device 2.

This tilting of the planet gear 20 continues as long as the elastic force E40 is greater than the traction force E50.

As long as the elastic force E40 overcomes the traction force E50, the planet gear 20 remains in the configuration of FIG. 4, to the point that it continues its secondary tilting movement in the direction of arrow F2, which causes it to go from the configuration of FIG. 3 to the configuration of FIG. 5.

Figure 6:
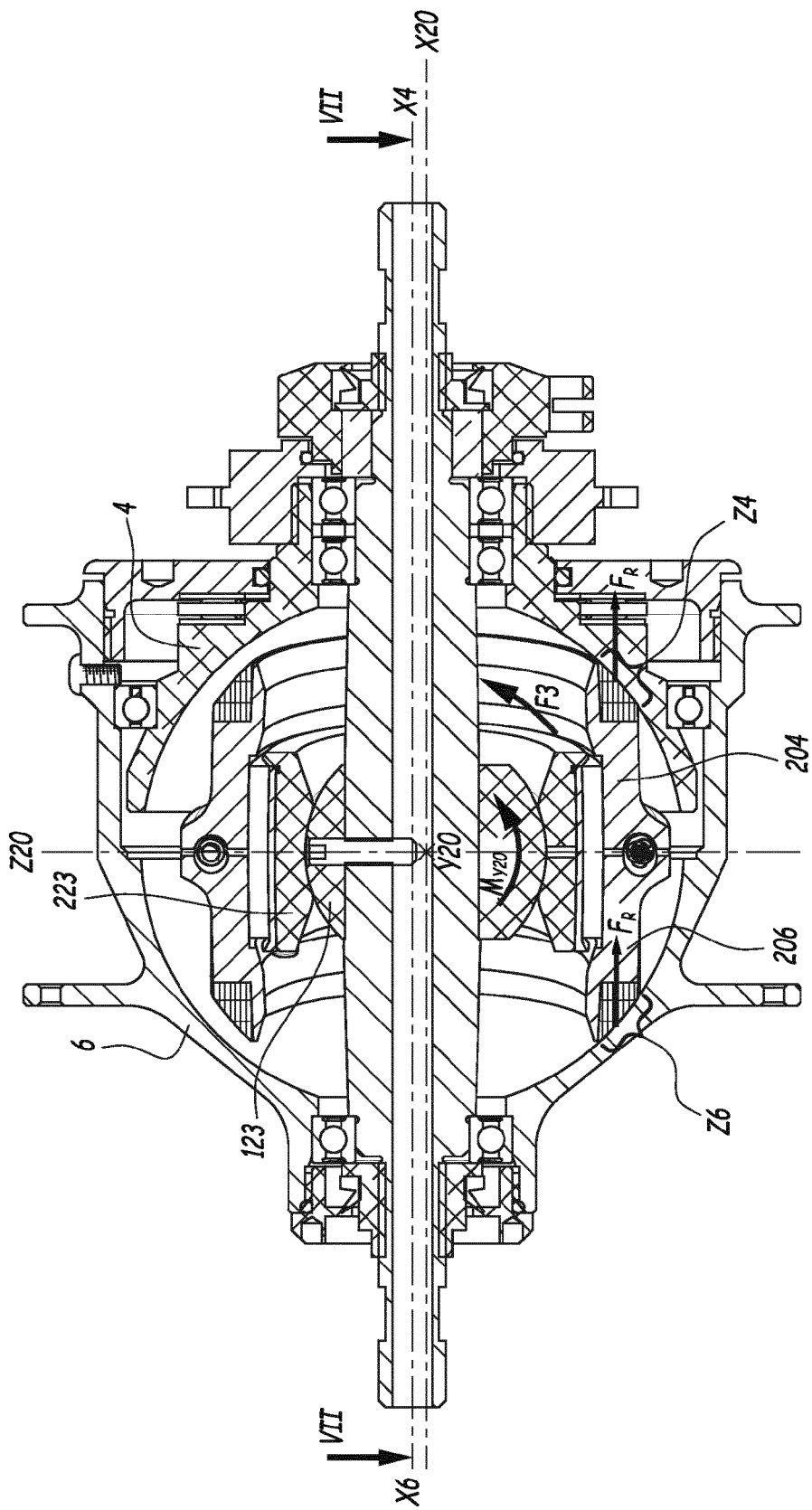
FIGS. 6 and 7 are cross-sections respectively similar to FIGS. 1 and 2 in a third usage configuration of the device; in these figures, V-V and VI-VI indicate the corresponding cutting planes.

On the contrary, in the configuration of FIGS. 6 and 7, the force D50 exerted via the cable 50 is greater than the elastic force E40 exerted by the cable 40, such that the planet gear 20 tilts in the clockwise direction around the axis Z20 in the plane of FIG. 7, as shown by arrow F1', which causes secondary tilting of that planet gear around the axis Y20 in the direction of arrow F3, in the plane of FIG. 6, the forces $F_R$ then in FIG. 7 having a direction opposite the direction of FIG. 4. This results in decreasing the transmission ratio of the device 2.

As long as the force E50 is greater than the elastic force E40, the planet gear 20 is kept in the configuration of FIG. 7, to the point that the secondary tilting of the planet gear 20 around the axis Y20 continues in the direction of arrow F3, which results in causing the planet gear to go from the configuration of FIG. 6 to that of FIG. 8.

Thus, indirect control is obtained inasmuch as the control of the tilting of the planet gear 20 takes place in the radial plane of FIGS. 2, 4 and 7, which is perpendicular to that which contains the zones Z4 and Z6 and that is that of FIGS. 1, 3, 5, 6 and 8.

In the second, third and fourth embodiments respectively shown in FIGS. 9 to 18, 19 and 20, and 21, the elements similar to those of the first embodiment bear the same references and work in the same way. Hereinafter, one only describes what distinguishes these other embodiments from the first embodiment.

In the second embodiment shown in FIGS. 9 to 18, the driving bell 4 of the continuously variable transmission device 2 is secured to a first shaft 104 that is a driving shaft and centered on a first axis X4. Likewise, the driven bell 6 is secured to a second shaft 106 centered on a second axis X6. The axes X4 and X6 respectively form axes of rotation for the bells 4 and 6. A planet gear 20 rotates around a third axis X20 included in the plane of FIG. 9, when it is driven by the driving bell 4. Said planet gear 20 comprises two rings 204 and 206 mounted together on a bearing 209. The rings 204 and 206 can form a single piece. A ball joint part 223 has a spherical outer surface S223 that is not coaxial with the axis X20 and that constitutes the central axis of the planet gear X20, and a cylindrical inner surface S'223 coaxial with the axis X20. The bearing 209 is radially accommodated inside the surface S'223. The bearing 209 and the ball joint part 223 together constitute a planet gear carrier for the planet gear 20 and define the position of the axis X20 relative to the bells 4 and 6.

The axes X4 and X6, which are aligned, are radially offset relative to the axis X20 by a non-zero distance $d_1$, as in the first embodiment. The rings 204 and 206 respectively bear contact belts 205 and 207 with the inner surfaces S4 and S6 of the bells 4 and 6.

A housing 150 is provided around the bells 4 and 6 of the planet gear 20. That housing 150 is made up of two flanges 154 and 156 that are respectively provided with passage orifices for the shafts 104 and 106, and a cylindrical body 158 secured to the two flanges. A ball joint part 153 is immobilized on the inner radial surface of the body 158 and cooperates with the ball joint part 223 to allow pivoting of the elements 209 and 223 and of the planet gear 20 around a fourth axis Y20 perpendicular to the plane of FIGS. 9, 11, 13, 15 and 17 and intersecting the axis Y20.

Since the surfaces of the ball joint parts 153 and 223 bearing on one another in slipping contact are in the form of a sphere portion, the elements 209 and 223 and the planet gear 20 can also pivot around a fifth axis Z20 comprised in the plane of FIGS. 9, 11, 13, 15 and 17 and perpendicular to the axis X20.

The bell 4 is supported by the housing 150 using a circular bearing 124 and an axial bearing 134. These bearings are respectively positioned between an outer radial surface 42 of the bell 4 and the cylindrical body 158 and between an axial surface 44 of the bell 4 and the flange 154. The bearings 124 and 134 each guide the rotation of the bell 4 around the axis X4. Likewise, two bearings 126 and 136 guide the rotation of the bell 6 around the axis X6, relative to the housing 150.

As more particularly shown by FIGS. 10, 12, 14, 16 and 18, the ball joint formed by the elements 153 and 223 is a Cardan joint with a control finger. More particularly, this ball joint comprises a finger or slug 30 engaged in a housing 224 of the part 223 and is secured to a piston 42 belonging to a control subassembly 40. This therefore procures free rotation of the elements 153 and 223 relative to one another around the axis Y20, locked rotation around the axis X20, and rotation indexed by the finger 30 around the axis Z20. The indexing of the rotation around the axis Z20 is induced by the translation of the finger 30, parallel to the axis X10. The control subassembly 40 also comprises a body 44 fastened on the housing 150, in which the piston 42 is positioned and which defines two chambers 46 and 48 each connected to a hose 52 or 54 supplied with a control fluid, such as oil. Alternatively, air or water can be used as control fluid.

The control subassembly 40 can also be produced via other technical solutions for translating a part such as a rack, a cam, a cable and other power means such as an electric motor, an electromagnetic, or a mechanical actuator.

Figure 9:
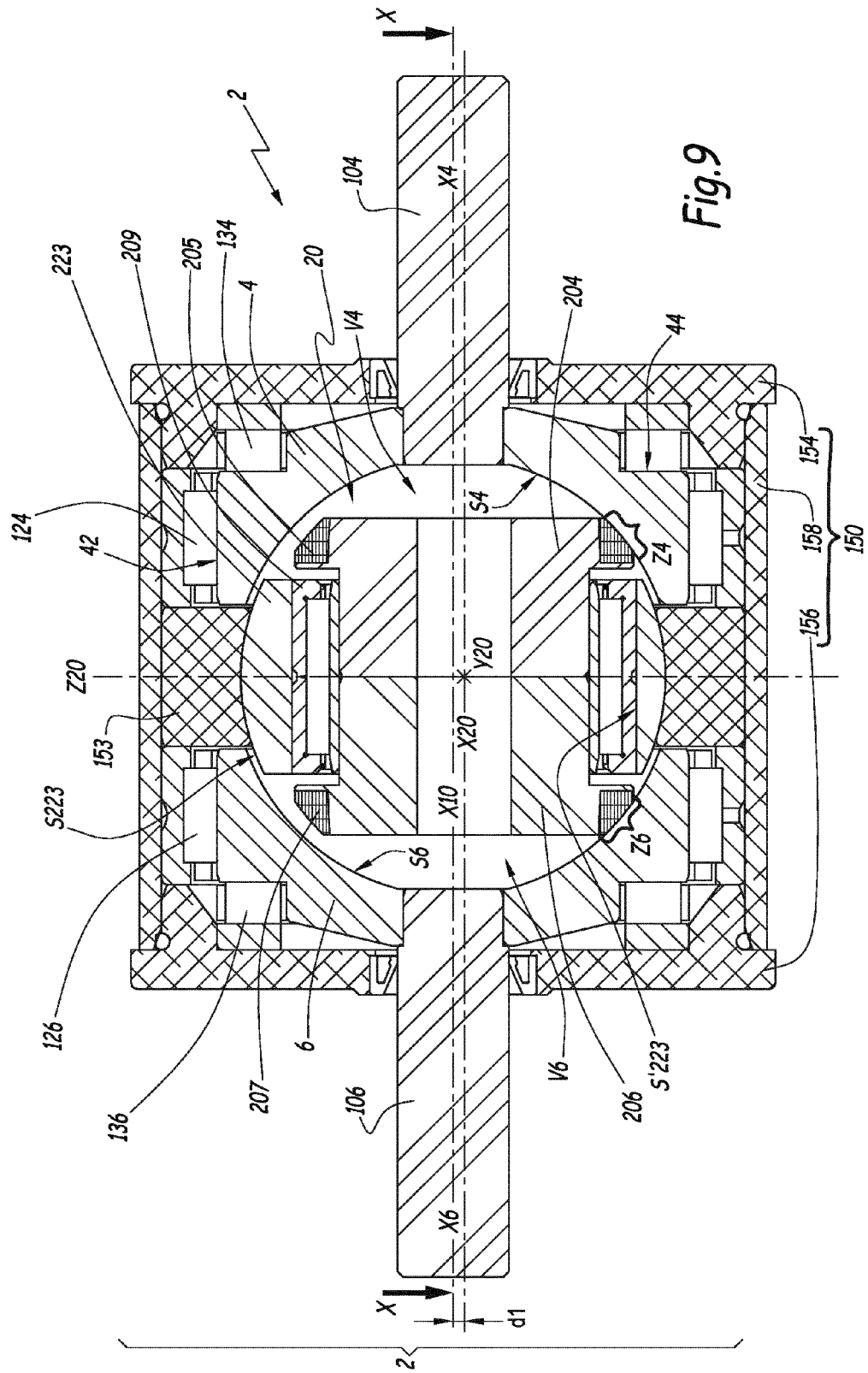
FIG. 9 is a cross-section similar to FIG. 1 for a device according to a second embodiment of the invention.
Figure 10:
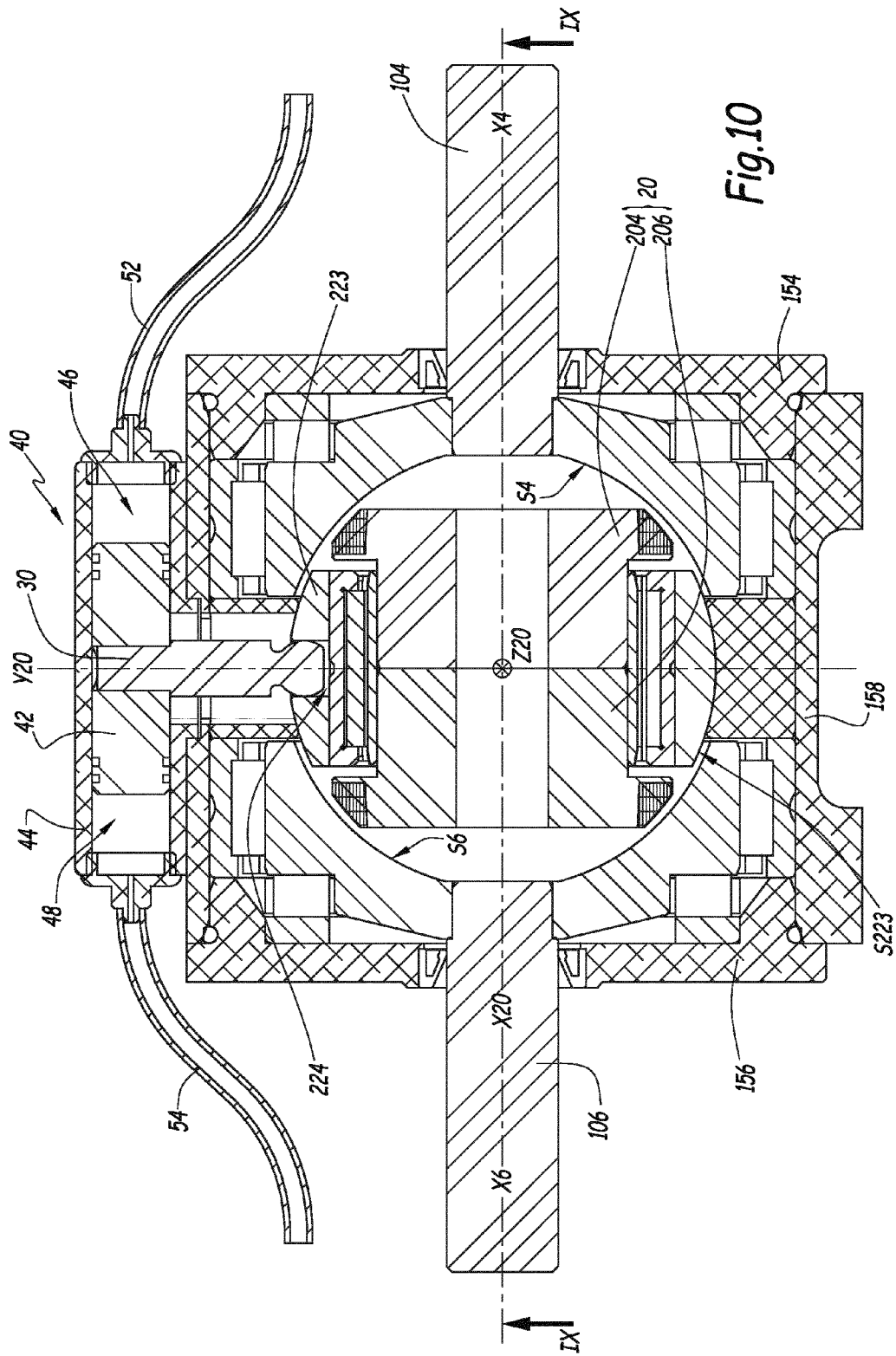
FIG. 10 is a cross-section along plane X-X of FIG. 9; in this figure, IX-IX indicates the cutting plane of FIG. 9.

In the configuration of FIGS. 9 and 10, the piston 42 is in the median position inasmuch as the chambers 46 and 48 have the same volume. In this configuration, which is comparable to that of FIGS. 1 and 2 for the first embodiment, contact zones Z4 and Z6 defined between the belts 205 and 207 on the one hand, and the inner surfaces S4 and S6 of the bells 4 and 6 on the other hand, are situated substantially at the same radial distance from the axes X4 and X6. In that case, the transmission ratio of the device 2 of the second embodiment is equal to 1.

Figure 12:
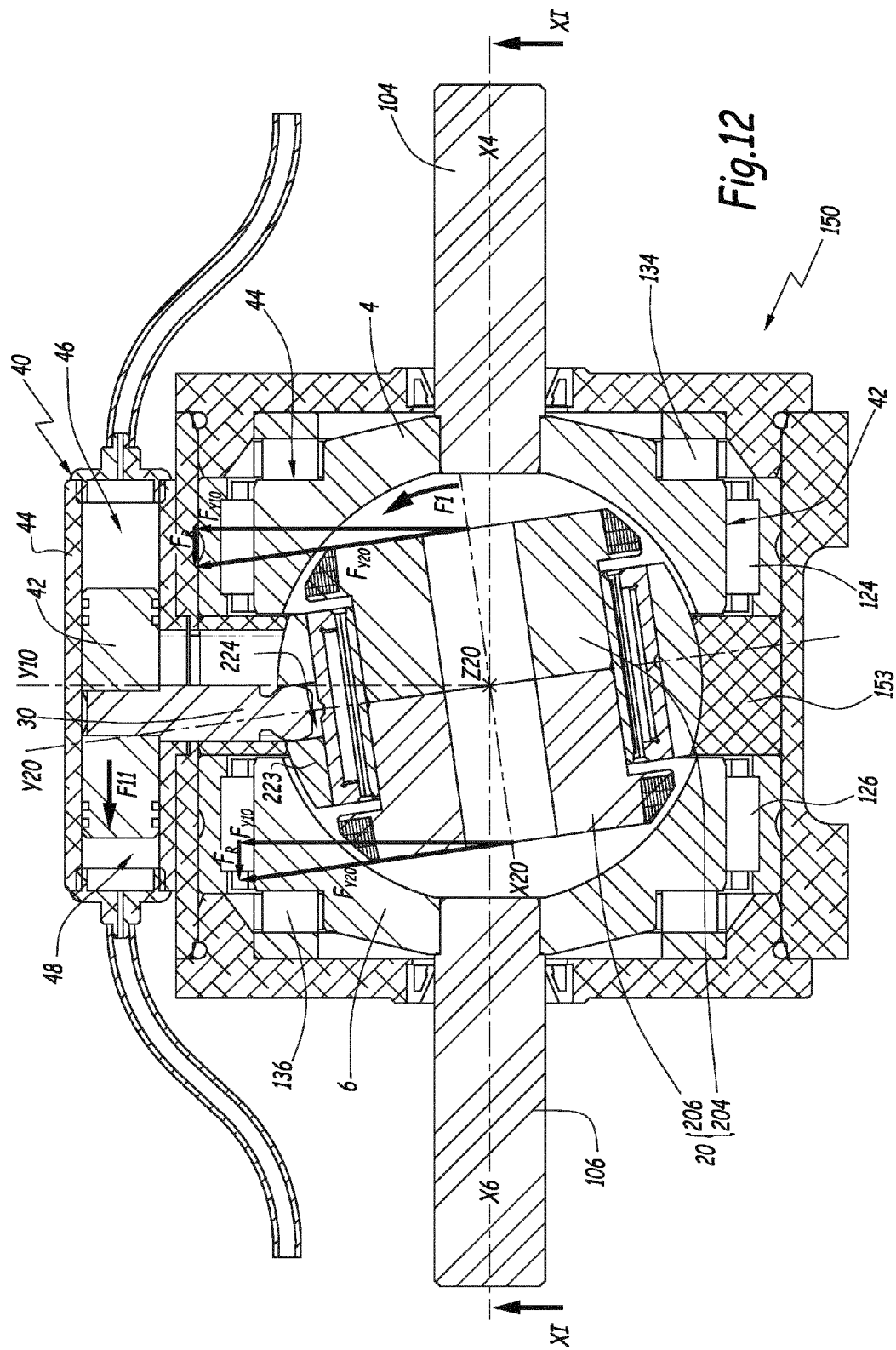
Figure 13:
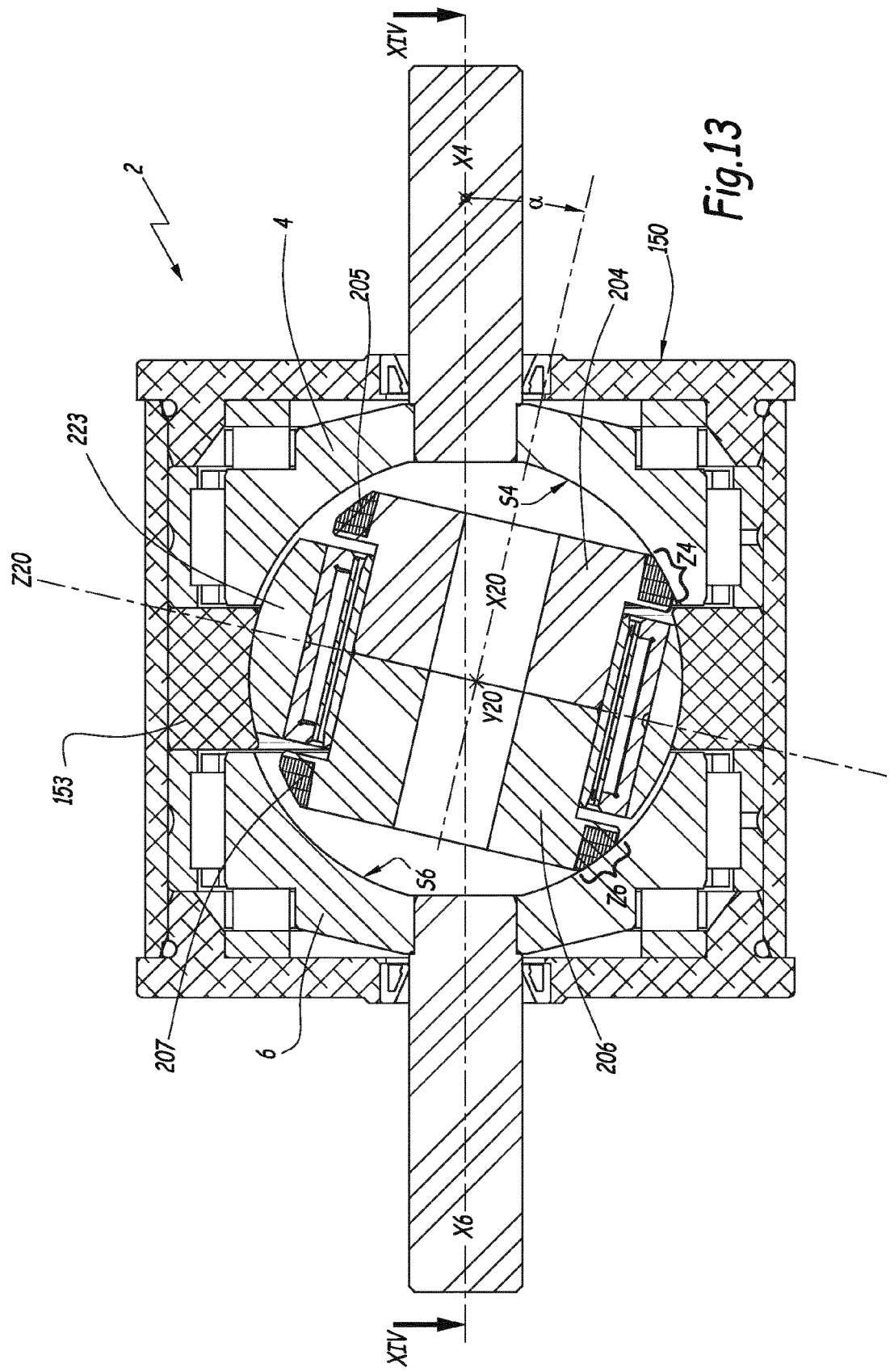
FIGS. 13 and 14 are cutting planes similar to FIGS. 9 and 10, respectively, in a third usage configuration of the device; in these figures, XIII-XIII and XIV-XIV indicate the corresponding cutting planes.
Figure 14:
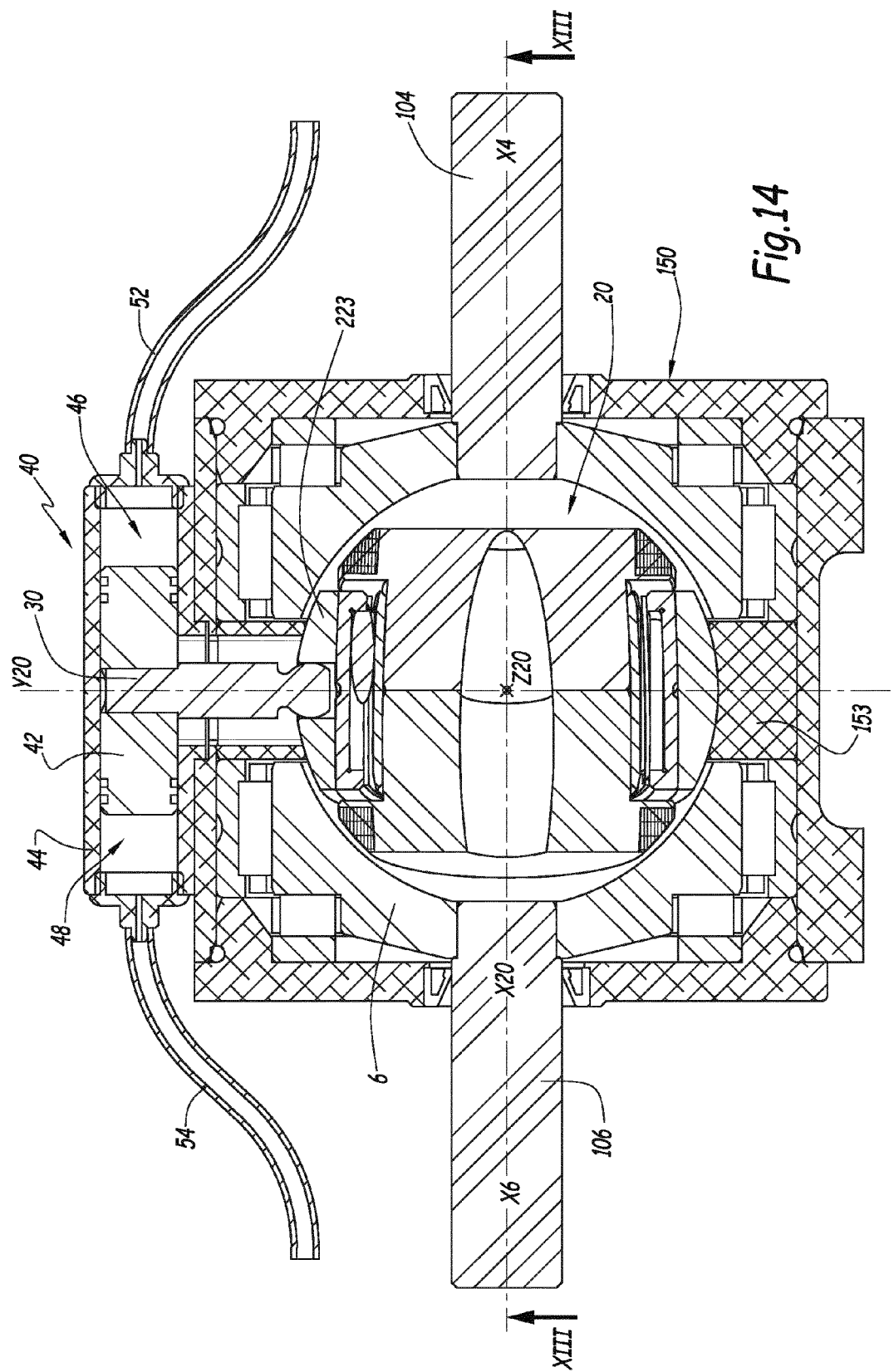
Figure 15:
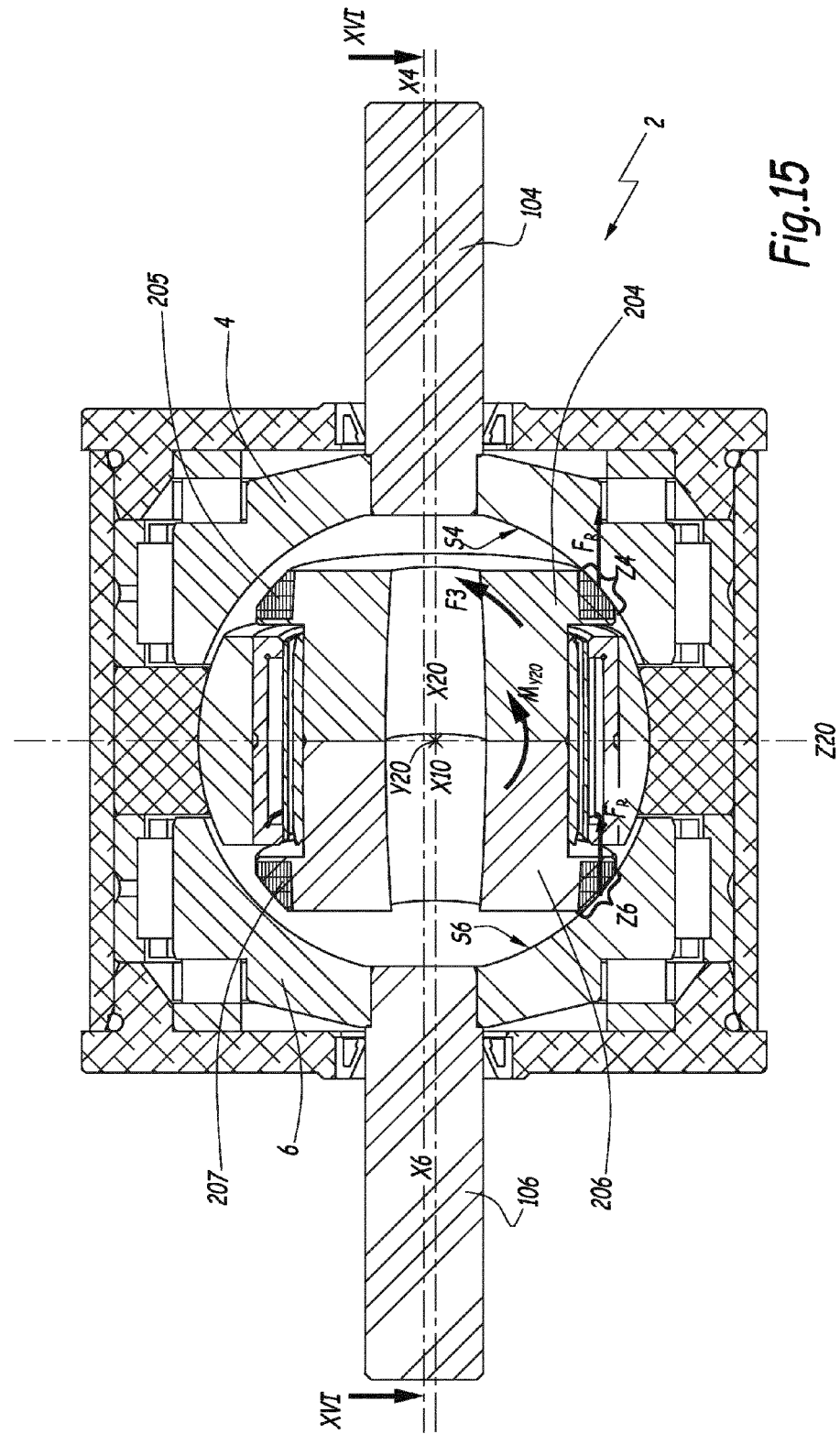
FIGS. 15 and 16 are cross-sections respectively similar to FIGS. 9 and 10 in the fourth usage configuration of the device; in these figures, XV-XV and XVI-XVI indicate the corresponding cutting planes.

When the transmission ratio of the device 2 needs to be increased, the piston 42 is moved toward the bell 6 in the plane of FIG. 12. This is obtained by supplying the chamber 46 with oil at a pressure higher than that present in the chamber 48. This movement of the piston 42 in the direction of arrow F11 drives the finger 30 toward the bell 6, which causes the part 223 of the ball joint to pivot around the axis Z20. This creates primary pivoting or tilting of the planet gear 20 in the trigonometric direction, as shown by arrow F1, in the plane of FIG. 12 around the axis Z20.

Figure 11:
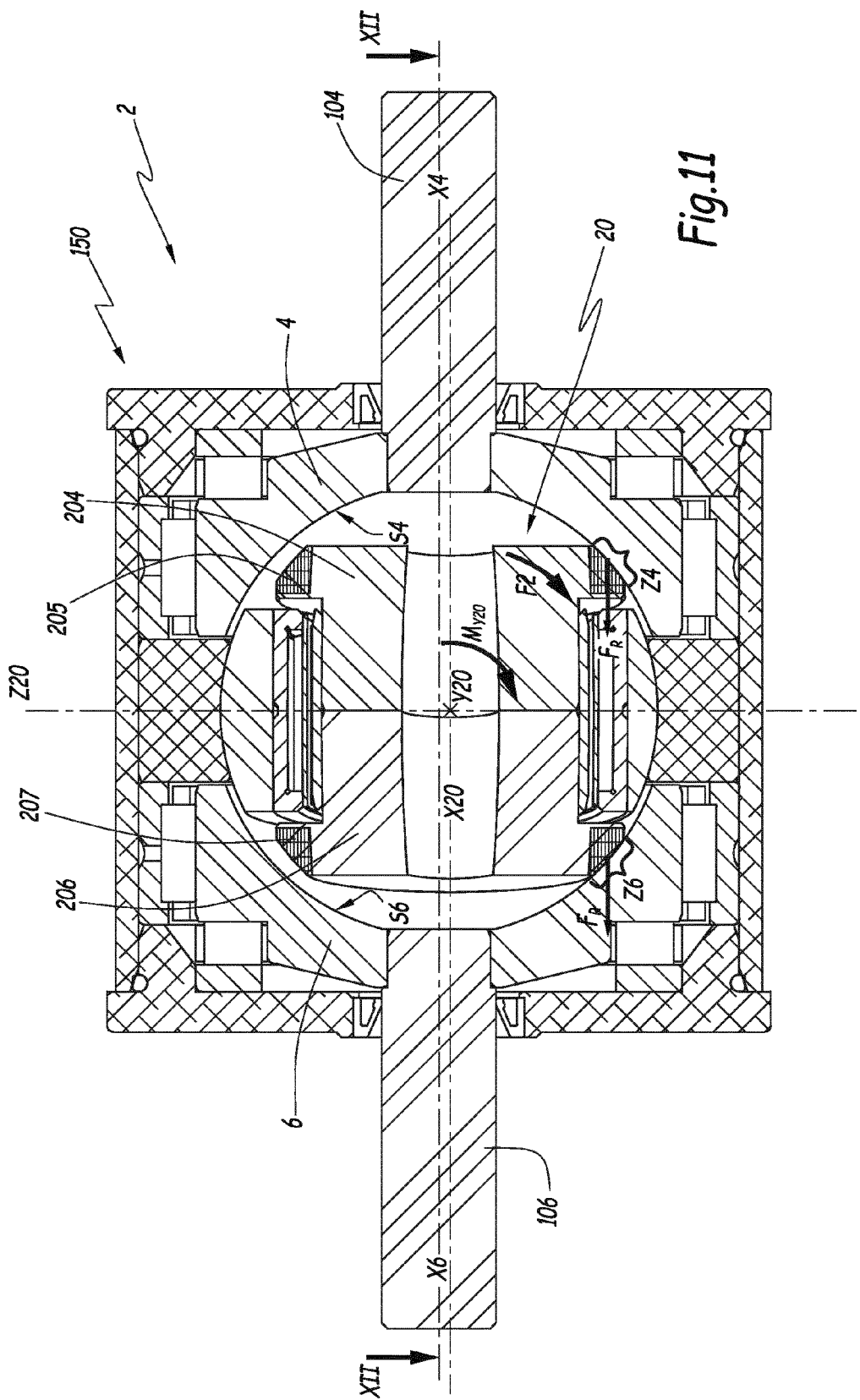
FIGS. 11 and 12 are cross-sections similar to FIGS. 9 and 10, respectively, in a second usage configuration of the device; in these figures, XI-XI and XII-XII indicate the corresponding cutting planes.

In the plane of FIG. 12, the axis of the planet gear X20 being non-parallel to the axes X4 and X6, traction forces $F_{Y10}$ of the bells and traction forces $F_{Y20}$ of the planet gear do not have the same direction and thereby create resultant forces $F_R$ at the origin of a pivot torque $M_{Y20}$ shown in FIG. 11. This primary tilting F1 of the planet gear 20 around the axis Z20, combined with the fact that the inner surfaces S4, S6 of the bells are warped and the bells are rotating, generates secondary tilting around the axis Y20 in the direction of arrow F2 in FIG. 11, i.e., in a direction increasing the transmission ratio.

The secondary tilting of the planet gear 20 around the axis Y20 continues as long as the planet gear 20 is kept in the tilted position shown in FIG. 12. This makes it possible to reach the configuration of FIG. 13, where the transmission ratio of the device 2 is maximal, while the planet gear 20 is in a stable configuration, pivoting around the axis Y20, since the piston 42 has been brought back to a median configuration, relative to the subassembly 40 body 44, balancing the oil pressures in the chambers 46 and 48. The planet gear 20 remains in that configuration as long as the piston 42 is not moved relative to the body 44.

In this configuration, the axes X20 and X4 define a non-zero angle α between them.

Figure 16:
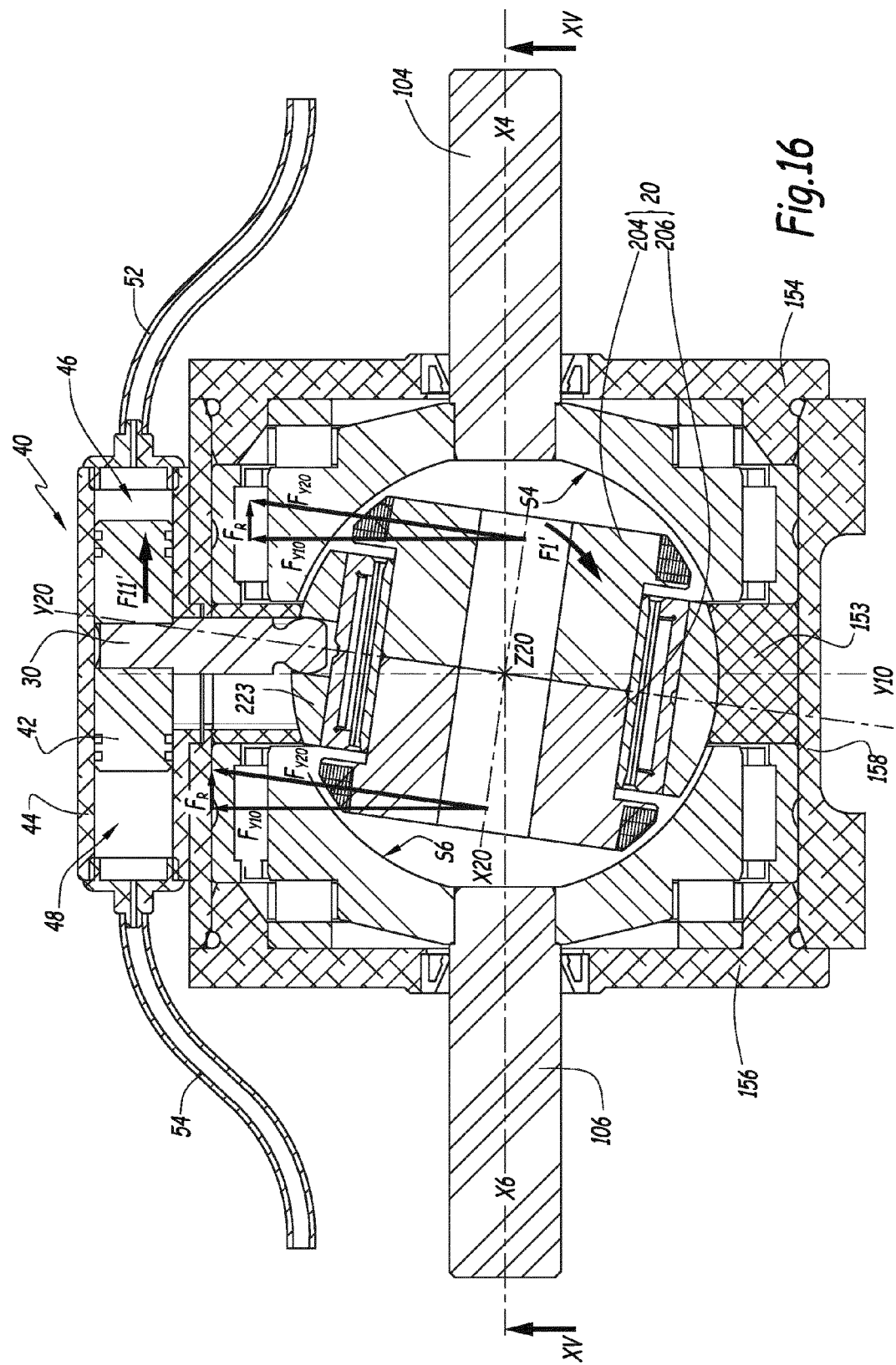

Conversely, when the transmission ratio of the speeds of the device 2 needs to be decreased, the piston 42 is moved toward the bell 4, in the direction of arrow F11' in FIG. 16, while supplying the chamber 48 with oil at a pressure greater than that present in the chamber 46. This results in moving the fingers 30 toward the bell 4 and causing the planet gear 20 to pivot in the direction of the arrow Ft around the axis Z20. This primary pivoting or tilting causes, for the same reasons as previously stated, secondary tilting of the planet gear 20 around the axis Y20, as shown by arrow F3 in FIG. 15, the forces $F_R$ then, in FIG. 16, being oriented in the direction opposite the direction in FIG. 12.

Figure 17:
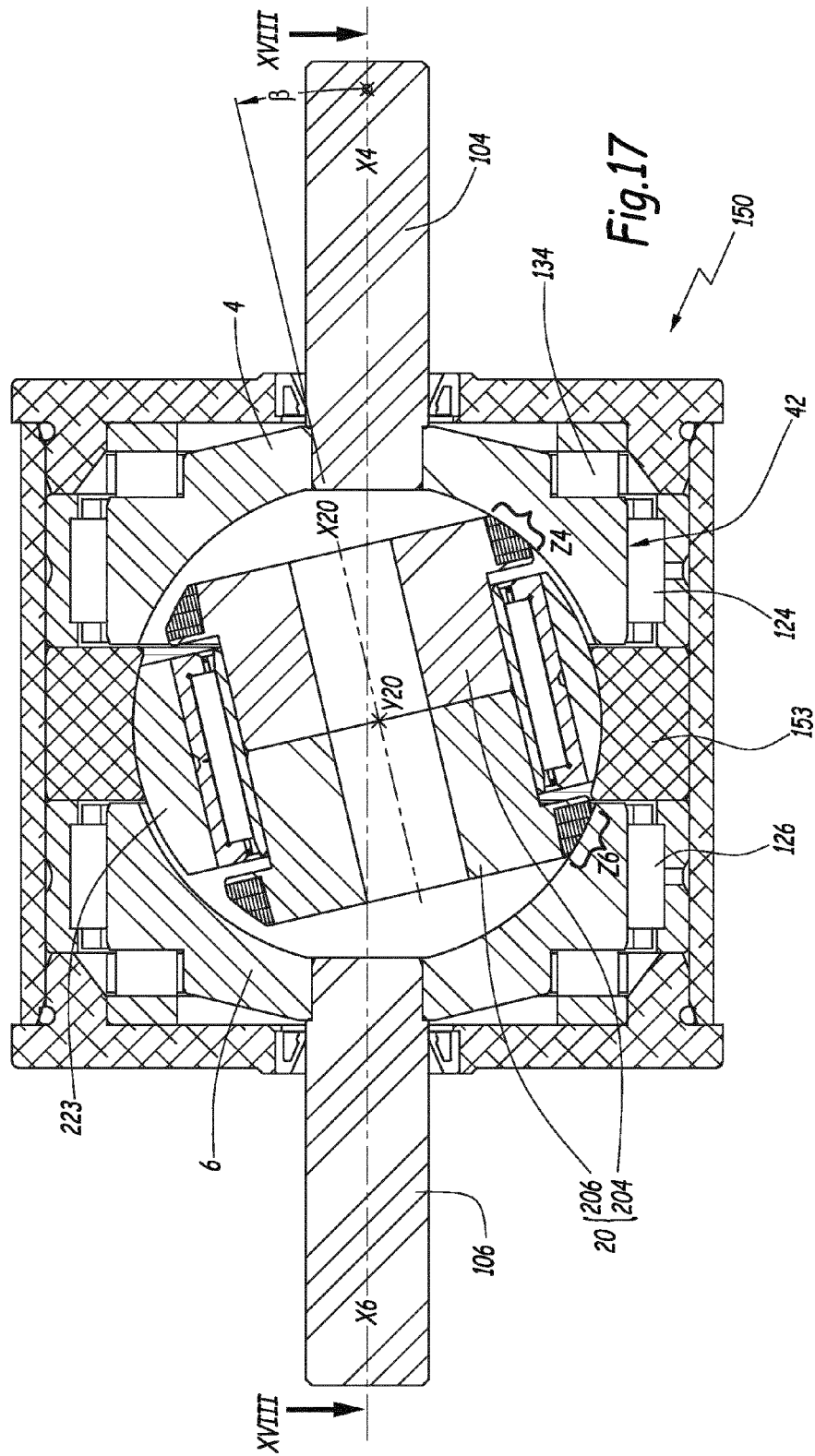
FIGS. 17 and 18 are cross-sections respectively similar to FIGS. 9 and 10 in a fifth usage configuration of the device; in these figures, XVII-XVII and XVIII-XVIII indicate the corresponding cutting planes.
Figure 18:
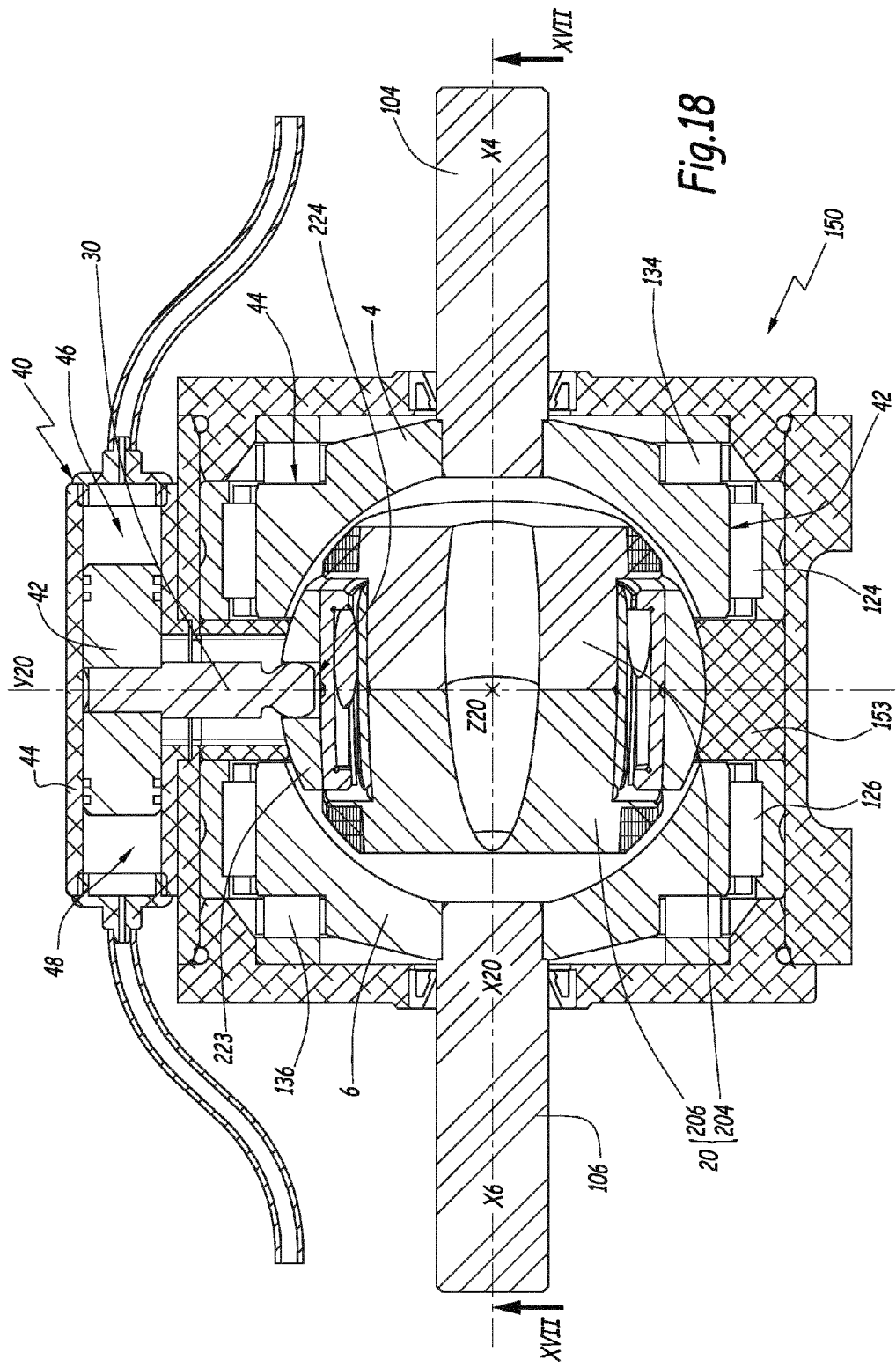

As before, this secondary tilting continues as long as the finger 30 is kept in the configuration of FIG. 16 until reaching the position of FIGS. 17 and 18, where the piston 42 is brought back to a central position relative to the body 44, which causes the position of FIG. 17 to be stable, in rotation around the axis Y20, for the planet gear 20.

In this configuration, the axes X20 and X4 define a non-zero angle β between them oriented in the direction opposite the angle α and having substantially the same value.

Thus, in this second embodiment as well, an indirect control of the pivoting of the planet gear 20 is obtained, owing to the fact that said planet gear pivots around the axis Z20 and is controlled in a plane perpendicular to the axis, using the subassembly 40.

According to an alternative of the second embodiment, instead of a Cardan joint with control finger between the planet gear carrier formed by the elements 209 and 223 on the one hand, and the housing 150 on the other hand, a double pivot link can be used. In this alternative, the planet gear carrier is made up of a first cradle where the bearing 209 is accommodated. This first cradle is connected to a second cradle by a pivot link with axis Y20. The rotation around the axis Y20 is free. The second cradle is connected to the casing 150 by a pivot link with axis Z20. The rotation around the axis Z20 is indexed by a control unit similar to the subassembly 40.

According to another alternative of this second embodiment, the bells 4 and 6 are respectively in a single piece with the shafts 104 and 106.

Figure 19:
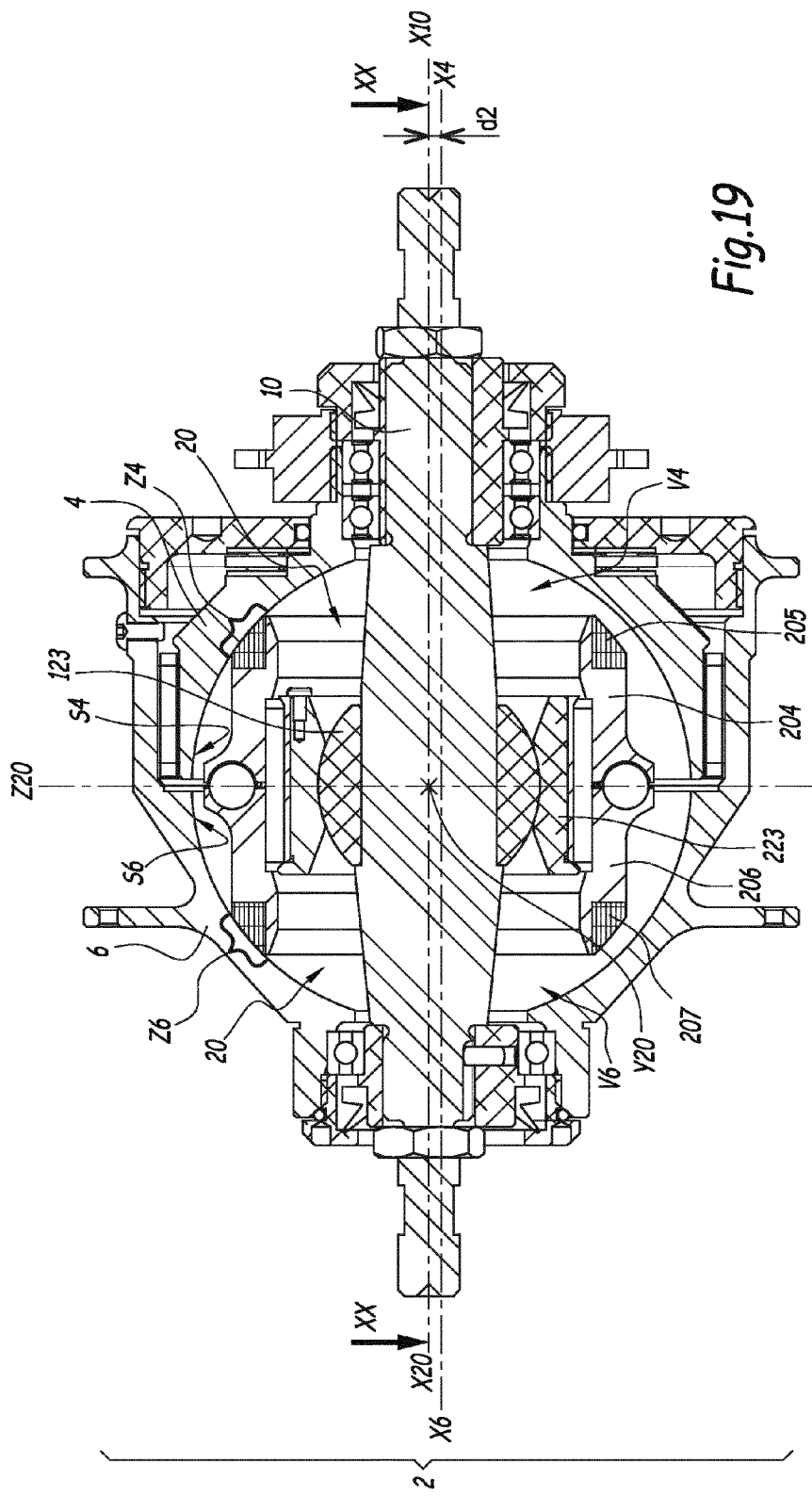
FIG. 19 is a cross-section similar to FIG. 1 for a device according to a third embodiment of the invention.
Figure 20:
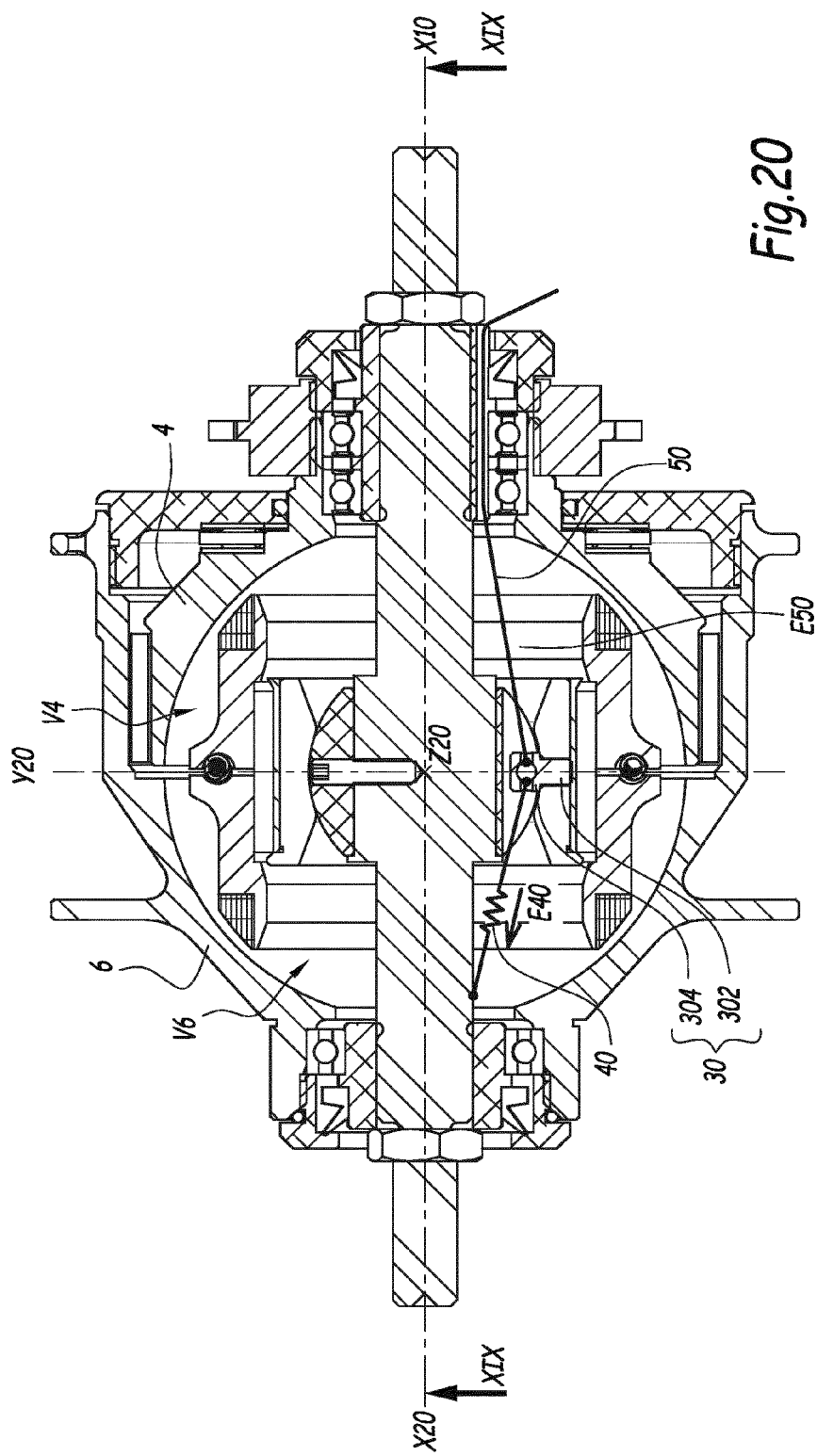
FIG. 20 is a cross-section along plane X-X of FIG. 19; in this figure, XIX-XIX indicates the cutting plane of FIG. 19.

In the third embodiment illustrated in FIGS. 19 and 20, a steering mode similar to that of the first embodiment is used for the continuously variable transmission device 2, with an action in a radial plane perpendicular to a radial plane containing the contact zones Z4 and Z6 between the planet gear 20 and the driving and driven bells 4 and 6. This embodiment differs from the first one in that the axes of rotation X10 and X20 are combined when they are parallel, while the axes of rotation X4 and X6 are axially offset relative to the axes X10 and X20 by a non-zero radial distance d2.

In the examples described in reference to the first and third embodiments, the cable 50 passes between the shaft and the bell 4. Alternatively, said cable can pass between the shaft and the bell 6. According to another alternative, the cable 50 can pass inside the shaft 10.

Figure 21:
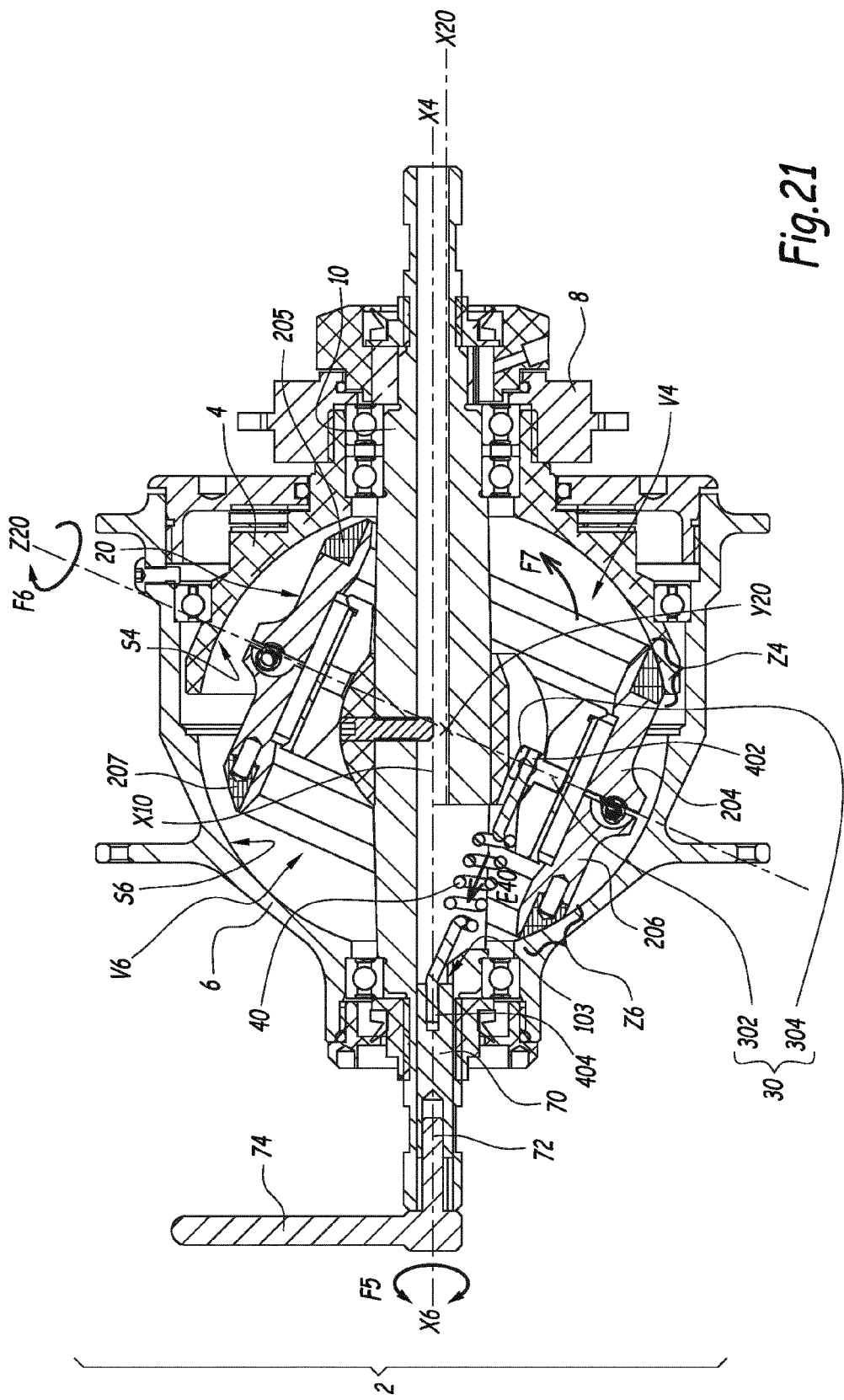
FIG. 21 is a view similar to FIG. 6 for a device according to a fourth embodiment of the invention.

In the fourth embodiment of the invention shown in FIG. 21, no cable or piston is used to control the movement of the planet gear 20 in the inner volumes V4 and V6 of the bells 4 and 6. In this embodiment, the pivoting control of the planet gear 20, to adjust the transmission ratio of the continuously variable transmission device 2, is done in a radial plane containing contact zones Z4 and Z6 respectively defined between the belts 205 and 207 of the planet gear 20 and the inner surfaces S4 and S6 of the bells 4 and 6.

An elastically deformable element, i.e., a spiral spring 40, is fastened between the head 304 of the slug 30, to which it is fastened by a first end 402, and an axially movable part 70, to which it is fastened by a second end 404. The spring 40 therefore exerts an elastic force E40 on the slug 30 comparable to that mentioned regarding the first two embodiments.

The part 70 is accommodated inside the housing 103 of the fixed shaft 10, that housing being centered on the axis X10. Said housing allows the translation along the axis X10 of the part 70, but locks its rotation around the axis X10. A control rod 72 connects the part 70 to a crank 74 situated outside the inner volume of the device 2, which is the sum of the inner volumes V4 and V6 of the bells 4 and 6, via a helical link. It is thus possible, by rotating the crank 74 around the axis X10, as shown by the double arrow F5, to move the part 70 axially along the axis X10. This movement makes it possible to vary the stiffness constant of the spring 40, and consequently the intensity of the force E40.

The planet gear 20 is mounted freely rotating around the axes Y20 and Z20, which are defined as in the first embodiment.

The operation is as follows: in the configuration of FIG. 21, the speed transmission ratio is maximal. As long as the bells 4 and 6 rotate at a stabilized speed, the planet gear 20 keeps the position shown in FIG. 21.

If the user wishes to decrease the transmission ratio of the device 2, he increases the driving torque of the driving bell 4. As a result, the input torque on the driving bell 4 is higher than the output torque on the driven bell 6. A differential torque is thus created between the bells 4 and 6. The planet gear is no longer statically balanced. The tangential contact force between the belt 205 and the surface S4 is higher than the tangential force between the belt 207 and the surface S6. Momentum is created around the axis Z20, which causes the planet gear 20 to tilt clockwise around the axis Z20, in the direction of arrow F6 in FIG. 21. As in the second embodiment, this primary tilting causes secondary tilting around the axis Y20, in the direction of arrow F7 FIG. 21, which decreases the radial distance between the zone Z4 and the axis of rotation X4 of the bell 4 and increases the radial distance between the zone Z6 and the axis of rotation X6 of the bell 6. Thus, the transmission ratio of the device 2 decreases.

If the planet gear 20 is in another configuration, in particular in a configuration where the transmission ratio is minimal, it is possible to increase the transmission ratio using an inverse phenomenon, while decreasing the torque exerted on the driving bell 4.

The aforementioned secondary tilting takes place against the elastic force E40. It is possible to modify the value of the differential torque from which this tilting can occur by playing on the stiffness constant of the spring 40, i.e., by moving the part 70 along the axis X10, inside the housing 104. The crank 74, the connecting rod 72 and the part 70 therefore constitute, with the spring 40, means for controlling the angular position of the planet gear 20 around the axis Y20, in the inner volume of the device 2 made up of the respective inner volumes V4 and V6 of the bells 4 and 6.

The invention is explained above and shown in the context of its use in the cycling field. It is, however, applicable in other fields, in particular those of motors or pumps as well as in the automobile field, and more generally in the field of mobility.

The technical features of the embodiments and alternatives considered above may be combined.

The invention claimed is:

1. A continuously variable transmission device for transmitting a rotational movement, comprising:
   a driving bell rotating around a first axis;
   a driven bell rotating around a second axis aligned with the first axis;
   a planet gear provided with a first belt in contact with an inner surface of the driving bell and a second belt in contact with an inner surface of the driven bell, contact zones between said belts and the inner surfaces of the bells being defined in a same first radial plane relative to the first axis, while the planet gear rotates around a third axis included in the first radial plane and an angular orientation of which relative to the first axis defines the transmission ratio of the device and while the planet gear pivots around a fourth axis perpendicular to the first radial plane and not intersecting the first axis;
   wherein the planet gear pivots around a fifth axis parallel to the first radial plane and perpendicular to the third axis.

2. The device according to claim 1, wherein an angular position of the planet gear around the fourth axis is adjustable by primary tilting of the planet gear around the fifth axis, said primary tilting causing secondary tilting of the planet gear around the fourth axis.

3. The device according to claim 1, wherein a secondary tilting of the planet gear is brought about by its primary tilting creating resultant forces, producing a pivoting torque, by the inner surfaces of the bells being warped, and by the bells rotating.

4. The device according to claim 1, wherein means for controlling an angular position of the planet gear around the fourth axis act on the planet gear by making the planet gear pivot around the fifth axis, by orienting the belts of the planet gear relative to the inner surfaces of the bells by primary tilting causing secondary tilting of the planet gear around the fourth axis.

5. The device according to claim 1, wherein the planet gear rotates freely around the fourth axis and the fifth axis and wherein a differential torque created between the driving bell and the driven bell acts on the planet gear by causing it to pivot around the fifth axis, by orienting the belts of the planet gear relative to the inner surfaces of the bells by primary tilting that causes secondary tilting of the planet gear around the fourth axis.

6. The device according to claim 1, wherein the driving bell and the driven bell are rotatably mounted on a same fixed shaft, a longitudinal axis of which is parallel to the first axis, and wherein the planet gear is mounted pivoting on the shaft, around the fourth axis.

7. The device according to claim 1, wherein the driving bell is secured to a driving shaft, wherein the driven bell is secured to a driven shaft, and wherein the device comprises a housing for maintaining and guiding the rotation of the driving bell, the driven bell and the planet gear.

8. The device according to claim 7, further comprising a planet gear carrier that defines the position of the third axis and is mounted pivotably around the fourth axis and around the fifth axis, relative to the housing.

9. The device according to claim 8, wherein the planet gear carrier is mounted in the housing by a Cardan joint with a control finger.

10. The device according to claim 9, wherein the control finger of the Cardan joint is translated in a plane perpendicular to the fifth axis and including the third axis.

11. The device according to claim 8, wherein the planet gear carrier is mounted in the housing by a double pivot link comprising a first pivot link around the fourth axis, that first pivot link being freely rotated, and a second pivot link around the fifth axis, that second pivot link being steered in rotation.

* * * * *